(12) United States Patent
Van Schyndel

(10) Patent No.: US 8,927,146 B2
(45) Date of Patent: Jan. 6, 2015

(54) LOW NOISE BATTERY

(75) Inventor: Andre John Van Schyndel, Kanata (CA)

(73) Assignee: Blackberry Limited, Waterloo, Ontario (CA)

(*) Notice: Subject to any disclaimer, the term of this patent is extended or adjusted under 35 U.S.C. 154(b) by 1130 days.

(21) Appl. No.: 12/612,567

(22) Filed: Nov. 4, 2009

(65) Prior Publication Data

US 2011/0020673 A1 Jan. 27, 2011

Related U.S. Application Data

(60) Provisional application No. 61/228,323, filed on Jul. 24, 2009.

(51) Int. Cl.
*H01M 4/02* (2006.01)
*H01M 2/26* (2006.01)
*H01M 10/058* (2010.01)
*H01M 10/04* (2006.01)

(52) U.S. Cl.
CPC *H01M 2/26* (2013.01); *Y02E 60/12* (2013.01); *H01M 10/058* (2013.01); *H01M 10/0431* (2013.01); *H01M 10/04* (2013.01)
USPC .................................................. 429/209

(58) Field of Classification Search
USPC ......................................................... 429/50
See application file for complete search history.

(56) References Cited

U.S. PATENT DOCUMENTS

| | | | |
|---|---|---|---|
| 5,230,967 A | 7/1993 | Radmall | |
| 6,307,151 B1 | 10/2001 | Roberson | |
| 7,280,808 B2 | 10/2007 | Murray et al. | |
| 2007/0166611 A1* | 7/2007 | Oh et al. | 429/160 |

FOREIGN PATENT DOCUMENTS

| | | |
|---|---|---|
| JP | 2000348757 A | 12/2000 |
| JP | 2001338686 A | 12/2001 |

OTHER PUBLICATIONS

PCT International Search Report, Application No. PCT/CA2009/001598, dated Apr. 23, 2010.
PCT International Preliminary Report on Patentability, PCT/CA2009/001598, Sep. 29, 2011.

* cited by examiner

*Primary Examiner* — Ula C. Ruddock
*Assistant Examiner* — Jacob Marks
(74) *Attorney, Agent, or Firm* — Quarles & Brady LLP

(57) ABSTRACT

An illustrative embodiment provides an apparatus comprising a positive electrode, a negative electrode, a separator, a first conductor, and a second conductor. The positive electrode and the negative electrode are separated by the separator. The first conductor is configured to transmit a first electrical current from the positive electrode. Also, the second conductor is configured to transmit a second electrical current from the negative electrode. A direction of the first electrical current transmitted through the first conductor is substantially opposite to a direction of the second electrical current transmitted through the second conductor. A magnitude of the first electrical current is substantially equal to a magnitude of the second electrical current. The first and second conductors are proximate to one another and a first portion of one of the first and second conductors is located inside the case along a separation distance, and a second portion of the one of the first and second conductors is located outside the case along the separation distance.

11 Claims, 15 Drawing Sheets

LOW NOISE BATTERY

This non-provisional patent application claims the benefit of priority of the filing date of U.S. Provisional Patent Application Ser. No. 61/228,323, filed Jul. 24, 2009, the entire contents of which application are incorporated herein by reference.

TECHNICAL FIELD

The present disclosure relates to batteries. Still more particularly, the present disclosure relates to a method and apparatus for a battery having low magnetic interference.

BACKGROUND

Mobile communication devices are popular for business and personal use. Such devices include Personal Digital Assistants (PDA), cellular phones, mobile phones, smart phones, and computers. These mobile devices provide wireless two-way voice and data communication over wireless networks. The wireless networks may be, but are not limited to, GSM/GPRS, CDPD, TDMA, CDMA, iDEN Mobitex, DataTAC, EDGE, EV-DO, UMTS, Bluetooth, variants of 802.11, and other wireless networks.

Electromagnetic fields are generated by electronic devices. The electromagnetic fields may interfere with other nearby electronic devices. The international standards on Hearing Aid Compatibility (HAC) establish a minimum signal-to-noise ratio at the T-coil of a hearing aid for effective magnetic wireless coupling to the hearing aid, (including cochlear implants, and assistive listening devices), while minimizing magnetic interference. Traditional approaches to meet the required signal-to-noise ratio in the presence of magnetic fields generated by mobile communication devices include increasing current to the receiver in the mobile communication device, installing a separate T-coil within the mobile communication device to increase the signal, and altering current loops and circuit board traces within the mobile communication device to reduce the noise from magnetic interference.

BRIEF DESCRIPTION OF THE DRAWINGS

For a better understanding of the various embodiments described herein, and to show more clearly how they may be carried into effect, reference will now be made, by way of example only, to the accompanying drawings which show at least one exemplary embodiment and in which.

DETAILED DESCRIPTION

Figure 1:
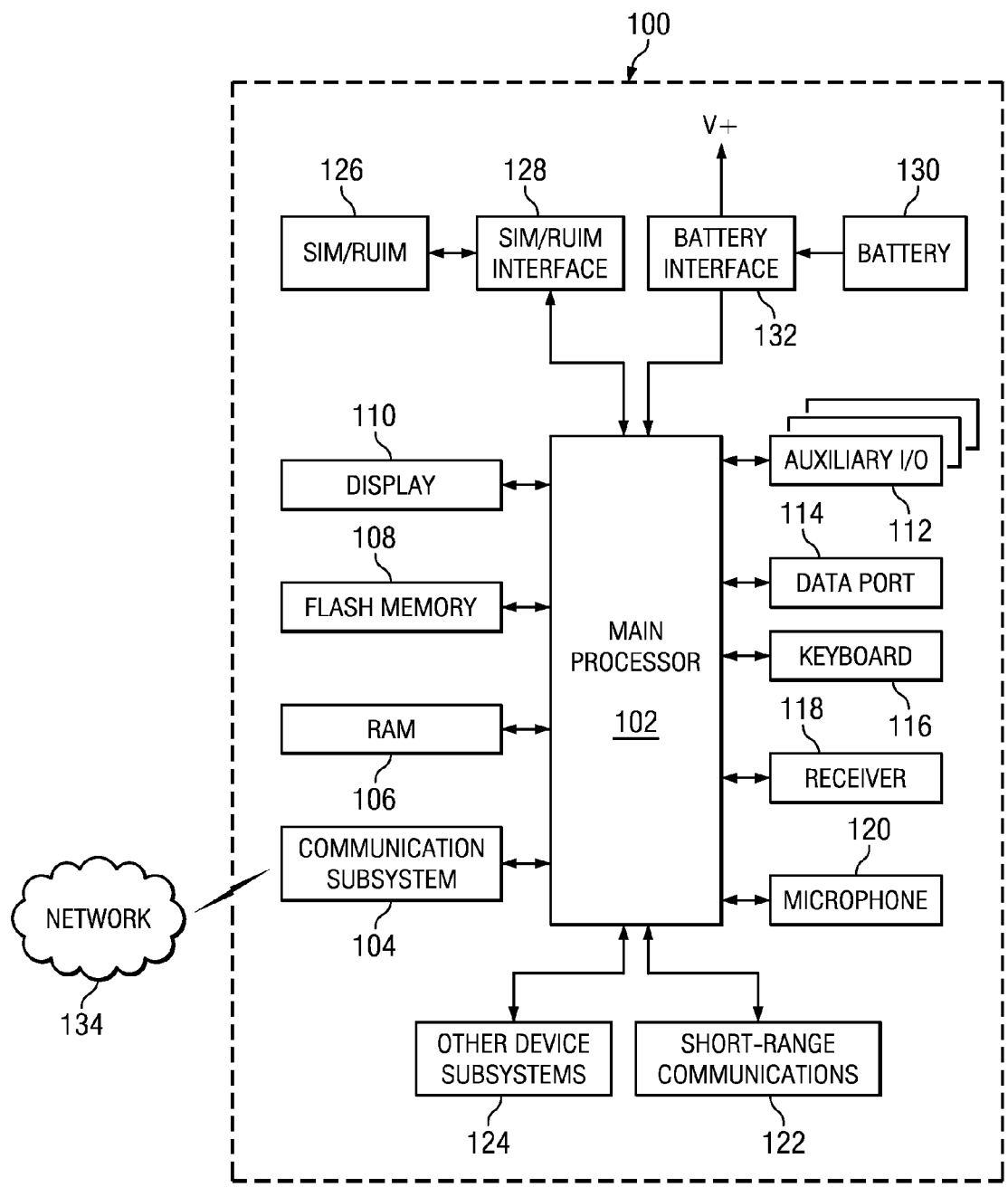
FIG. 1 is a block diagram illustrating a wireless mobile communication device in accordance with an illustrative embodiment.

The different illustrative embodiments recognize and take into account a number of different considerations. For example, one or more of the illustrative embodiments recognize that a substantial portion of the noise generated by a mobile communication device is caused by the circuits in the mobile communication device. One or more of the different illustrative embodiments recognize and take into account a battery in the mobile communication device generates a significant amount of noise as compared to other components in the mobile communication device.

In view of this recognition, the different illustrative embodiments may help to reduce the amount of noise generated by the battery. The noise in the battery may be caused by the tabs or conductors being attached on different sides of the electrodes, the tabs or conductors being asymmetric, having case connections at different locations inside and outside of the case, and external wiring routed without matching opposite currents.

It will be appreciated that for simplicity and clarity of illustration, where considered appropriate, reference numerals may be repeated among the figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures, and components have not been described in detail so as not to obscure the embodiments described herein. Also, the description is not to be considered as limiting the scope of the embodiments described herein.

The embodiments described herein generally relate to a wireless mobile communication device, sometimes referred to hereinafter as "user equipment", which can be configured according to an IT policy. It should be noted that the term "IT policy", in general, refers to a collection of IT policy rules, in which the IT policy rules can be defined as being either grouped or non-grouped and global or per-user. The terms "grouped", "non-grouped", "global", and "per-user" are defined further below. Examples of applicable communication devices include pagers, cellular phones, cellular smartphones, wireless organizers, personal digital assistants, computers, laptops, handheld wireless communication devices, wirelessly enabled notebook computers and the like.

Turning to FIG. 1, a block diagram of an exemplary embodiment of user equipment 100 is depicted in accordance with an illustrative embodiment. User equipment 100 includes one or more components such as main processor 102; communication subsystem 104 that receives messages from, and sends messages to, wireless network 134; Random Access Memory (RAM) 106; flash memory 108; display 110; auxiliary input/output (I/O) subsystem 112; data port 114; keyboard 116; receiver 118; microphone 120; subscriber identity module/removable user identity module card 126; and subscriber identity module/removable user identity module interface 128; short-range communications 122; other device subsystems 124.

User equipment 100 is a battery-powered device and includes battery interface 132 for receiving at least one battery 130 which may be rechargeable. In at least some embodiments, battery 130 can be a smart battery with an embedded microprocessor. Battery interface 132 is coupled to a regulator (not shown), which assists battery 130 in providing power to user equipment 100. Although current technology makes use of a battery, future technologies such as micro fuel cells may provide the power to user equipment 100.

Figure 2:
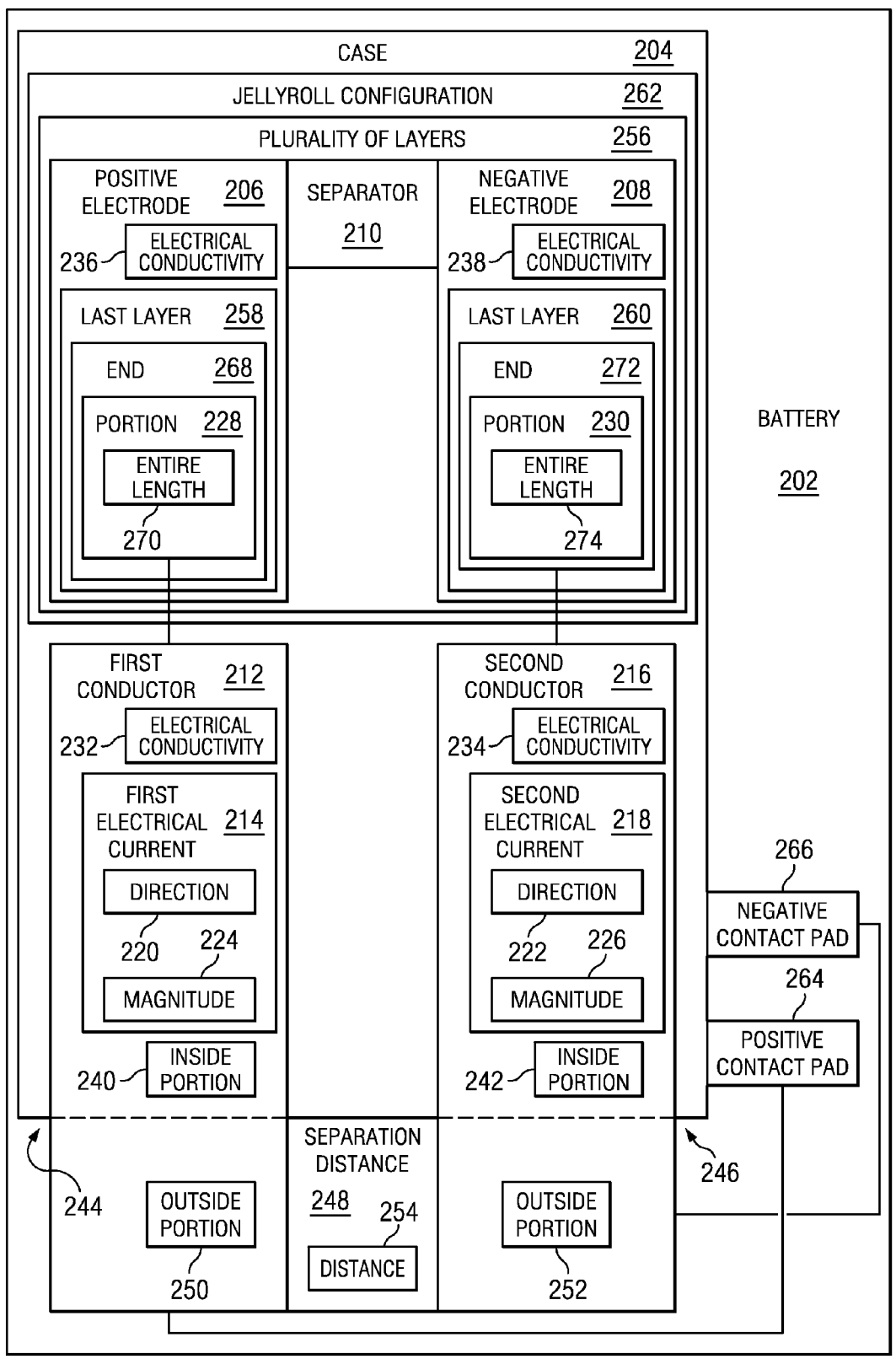
FIG. 2 is a block diagram illustrating a battery in accordance with an illustrative embodiment.

Turning now to FIG. 2, a block diagram of a battery is depicted in accordance with an illustrative embodiment. Battery 202 may be one implementation of battery 130 of FIG. 1 for user equipment, such as user equipment 100 of FIG. 1. Battery 202 comprises case 204. On the outside of case 204 is negative contact pad 266 and positive contact pad 264. Negative contact pad 266 and positive contact pad 264 may be used to provide power to the rest of the components in the user equipment. Positive contact pad 264 and negative contact pad 266 may be connected to, be a part of, or be an extension of, first conductor 212 and second conductor 216, respectively.

Case 204 contains jellyroll configuration 262, and inside portions 240 and 242 of first conductor 212 and second conductor 216, respectively. Jellyroll configuration 262 comprises coated metallic films, such as plurality of layers 256, that are rolled up and flattened (referred to as a "jellyroll" electrode assembly). In different embodiments, case 204 may comprise a stacked configuration, folded back and forth like an accordion (referred to as a Z-type electrode assembly), instead of a jellyroll configuration. Reference will be made hereinafter to the construction and design of "jellyroll" electrode assemblies; although a person of skill in the art will appreciate that the principles set forth herein apply equally to other designs and configurations of electrode assemblies.

Jellyroll configuration 262 may comprise plurality of layers 256. Plurality of layers 256 may comprise positive electrode 206, separator 210, and negative electrode 208. Separator 210 comprises electrolyte. Ions in battery 202 flow through electrolyte. In different illustrative embodiments, separator 210 may comprise one or more layers of electrolyte in between positive electrode 206 and negative electrode 208. In different embodiments, separator 210 may also comprise one or more layers on the other side of positive electrode 206 and/or negative electrode 208.

Separator 210 contains an electrolyte, such as lithium salts, such as LiPF6, LiBF4, or LiClO4, in an organic solvent, such as ether. The electrolyte may also be acid such as in a lead-acid battery, alkaline electrolyte usually potassium hydroxide in a nickel metal hydride or nickel cadmium. Positive electrode 206 may comprise a thin sheet of aluminum (e.g. 15 microns) that is coated on both sides (e.g. 60-70 microns per side) with Lithium cobalt oxide (LiCoO2), or other suitable material, while negative electrode 208 may comprise a thin sheet of copper foil (e.g. 10 microns) that is coated on both sides with graphite (e.g. 60-70 microns per side), such that electrical current flows from positive electrode 206 to negative electrode 208. Separator 210 has openings in it that allow the electrolyte liquid to permeate between positive electrode 206 and negative electrode 208. Separator 210 thus physically separates the two electrode sheets while allowing ions to flow between them. Separator 210 may have a thickness of about 20 microns. However, in different embodiments, separator 210 may have other thicknesses.

The different embodiments recognize that sources of magnetic noise in batteries, such as battery 202, include noise from the electric currents, such as first currents flowing in the jellyroll configuration 262, ion currents in the electrolyte liquid, currents flowing in the inside portions 240 and 242 of conductors 212 and 216 from positive electrode 206 and negative electrode 208 to positive feed-through 244 and to negative feed-through 246, currents flowing in case 204, and currents flowing in the outside portions 250 and 252 of conductors 212 and 216.

Positive electrode 206 comprises electrical conductivity 236 and last layer 258. Electrical conductivity 236 is the measure of an object's or circuit's ability to conduct an electric current between two points. Electrical conductivity 236 may depend on the material and shape of the object. Last layer 258 is the last layer in jellyroll configuration 262, and is an outside layer on jellyroll configuration 262. Last layer 258 comprises end 268. End 268 may be any end of last layer 258. End 268 may be perpendicular or horizontal to an axis of the roll of jellyroll configuration 262. End 268 may be the edge of last layer 258 or may be a portion of last layer 258 leading up to an edge of last layer 258. For example, end 268 may be 5 millimeters leading up to an edge of last layer 258. End 268 may be more or less than 5 millimeters. End 268 comprises portion 228. Portion 228 may be any length along end 268. Portion 228 may comprise entire length 270. Entire length 270 is when portion 228 extends across the entire length of end 268.

Negative electrode 208 comprises electrical conductivity 238 and last layer 260. Last layer 260 is the last layer in jellyroll configuration 262, and has an outside layer on jellyroll configuration 262. Last layer 260 comprises end 272. End 272 may be any end of last layer 260. End 272 may be perpendicular or horizontal to an axis of the roll of jellyroll configuration 262. End 272 may be the edge of last layer 260 or may be a portion of last layer 260 leading up to an edge of last layer 260. For example, end 272 may be 5 millimeters leading up to an edge of last layer 258. End 272 may be more or less than 5 millimeters. End 272 comprises portion 230. Portion 230 may be any length along end 272. Portion 230 may comprise entire length 274. Entire length 274 is when portion 230 extends across the entire length of end 272.

First conductor 212 is a conductor connected to positive electrode 206 along portion 228. First conductor 212 is also connected to positive contact pad 264. First conductor 212 comprises electrical conductivity 232, first electrical current 214, inside portion 240, and outside portion 250. Electrical conductivity 232 of first conductor 212 is higher than electrical conductivity 236 of positive electrode 206, allowing electrical currents, such as first electrical current 214, to collect in first conductor 212. The material of first conductor 212 may be more conductive than the material of positive electrode 206.

First electrical current 214 comprises direction 220 and magnitude 224. Direction 220 is the direction of the electrical current 214 and magnitude 224 is the magnitude of electrical current 214. First electrical current 214 causes a magnetic field. A positive current will result in the opposite magnetic field as that of a negative current flowing in the opposite direction. Also, a positive current will result in the opposite magnetic field as a positive current flowing in an opposite direction.

Inside portion 240 comprises the portion of first conductor 212 that remains inside of case 204. Outside portion 250 comprises the portion of first conductor 212 that remains outside of case 204.

Second conductor 216 is a conductor connected to negative electrode 208 along portion 230. Second conductor 216 is also connected to negative contact pad 266. Second conductor 216 comprises electrical conductivity 234, second electrical current 218, inside portion 242, and outside portion 252. Electrical conductivity 234 of second conductor 216 is higher than electrical conductivity 238 of negative electrode 208, allowing electrical currents, such as second electrical current 218, to collect in second conductor 216. The material of second conductor 216 may be more conductive than the material of negative electrode 208. Also, while it appears in FIG. 2 that first conductor 212 and second conductor 216 are both connected to case 204, it is recognized that only one conductor may be physically touching or connected to case 204 at any given time.

Second electrical current 218 comprises direction 222 and magnitude 226. Direction 222 is the direction of the electrical current 218 and magnitude 226 is the magnitude of electrical current 218. Second electrical current 218 causes a magnetic field.

Inside portion 242 comprises the portion of second conductor 216 that remains inside of case 204. Outside portion 252 comprises the portion of second conductor 216 that remains outside of case 204.

Positive feed-through 244 and negative feed-through 246 are the portions of case 204 where first conductor 212 and second conductor 216 exit case 204, respectively. Positive feed-through 244 and negative feed-through 246 are separated by separation distance 248. Separation distance may be any distance 254.

First conductor 212 and second conductor 216 may have about 10 or more times the conductivity than the positive electrode 206 and negative electrode 208. The increase in conductivity may be achieved because the first conductor 212 and second conductor 216 are thicker by about 10 times or more than the first and second electrodes. The positive electrode 206 and negative electrode 208 are typically only 10 microns thick.

The illustration of battery 202 in FIG. 2 is not meant to imply physical or architectural limitations to the manner in which different illustrative embodiments may be implemented. Other components in addition to, and/or in place of, the ones illustrated may be used. Some components may be unnecessary in some illustrative embodiments. Also, the blocks are presented to illustrate some functional components. One or more of these blocks may be combined and/or divided into different blocks when implemented in different illustrative embodiments.

Additionally, negative contact pad 266 and positive contact pad 264 may not be the only types of contact pads. For example, there may also be a temperature contact pad and a cryptography contact pad as well as other types of pads. Also, there may be more layers in plurality of layers 256. For example, there may be a second positive electrode, a second negative electrode and a second separator. The second set of electrodes and separator may be rolled up with the first layer, positive electrode 206, separator 210, and negative electrode 208.

Figure 3:
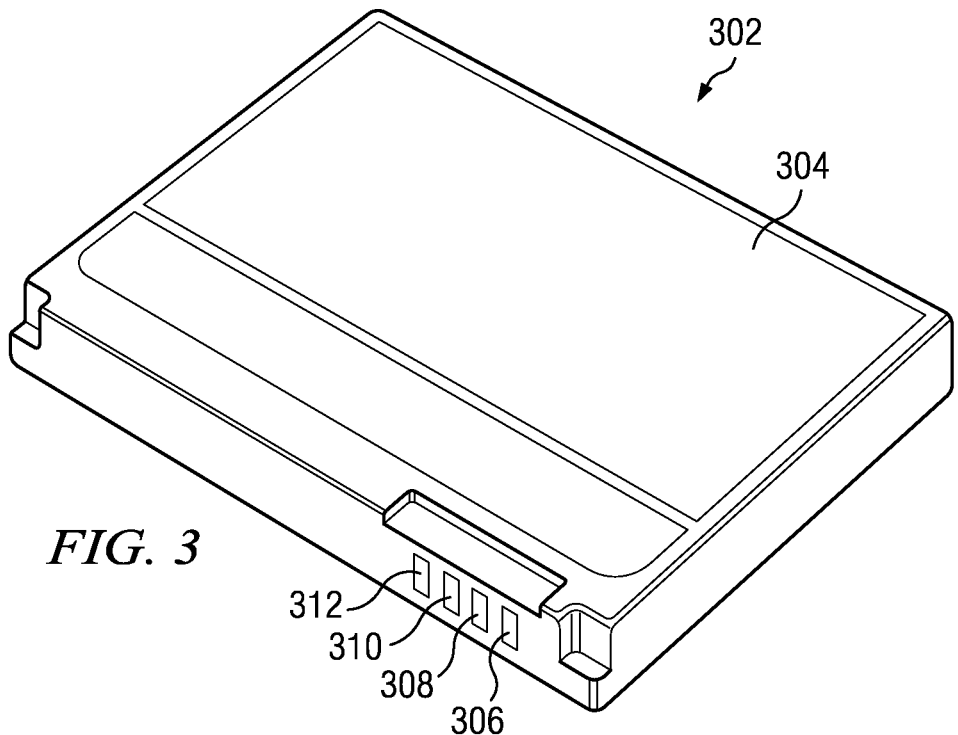
FIG. 3 is a perspective view of a battery in accordance with an illustrative embodiment.

Turning now to FIG. 3, a battery for powering user equipment is depicted in accordance with an illustrative embodiment. Battery 302 is an example of one implementation of battery 202 in FIG. 2. In this illustrative example, battery 302 includes an electrode assembly assembled inside case 304 and includes positive contact pad 306, negative contact pad 312, temperature contact pad 310, and cryptography contact pad 308 for testing manufacturer's authenticity of battery 302. Case 304 may be one implementation of case 204 of FIG. 2.

In different embodiments, the pads may be in a different order or location. Additionally, some pads may not be on the case, such as cryptography contact pad 308. In other embodiments, other types of pads may be used. Battery 302 may include an internal microprocessor and a switch in series with positive contact pad 306 and negative contact pad 312 which is opened by the internal microprocessor if battery 302 discharges below a predetermined level, in order to avoid damage to the battery. Likewise, if the battery temperature elevates beyond a predetermined level, as indicated on temperature contact pad 310, the microprocessor may cause the switch to open.

Figure 4:
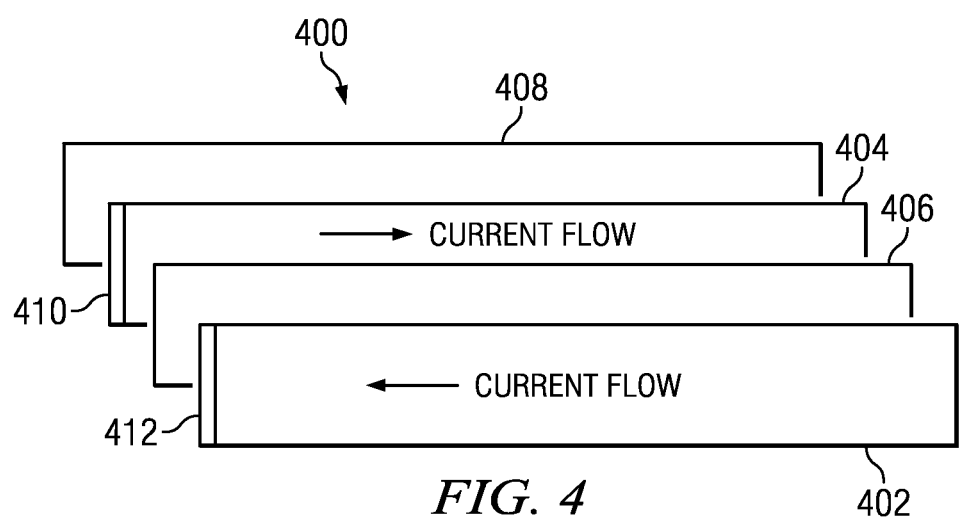
FIG. 4 is a schematic representation of positive and negative electrodes with other layers of a battery in an un-rolled configuration in accordance with an illustrative embodiment.

Turning now to FIG. 4, a schematic representation of positive and negative electrodes with other layers of a battery in an un-rolled configuration is depicted in accordance with an illustrative embodiment. Electrode assembly 400 is an un-rolled "jellyroll". Electrode assembly 400 may be one implementation of jellyroll configuration 262 of FIG. 2. Electrode assembly 400 comprises a positive electrode sheet 402 (cathode) and negative electrode sheet 404 (anode) sandwiched together with separator sheet 406 between them, and a further outer separator sheet 408 that may curl around the end of positive electrode sheet 402 at the innermost section of the jellyroll so as to completely isolate the positive and negative electrodes. Separator sheet 406 and outer separator sheet 408 may be one implementation of separator 210 of FIG. 2. Positive electrode sheet 402 and negative electrode sheet 404 may be one implementation of positive electrode 206 and negative electrode 208 of FIG. 2.

An electrical connection between negative electrode sheet 404 and negative contact pad 312 of FIG. 3 may be made via negative conductor 410 that extends to an insulated feed-through which connects to a conductive strip that is insulated from the case by an insulator. An electrical connection between positive electrode sheet 402 and positive contact pad 306 of FIG. 3 may be made either by leaving the aluminum electrode uncoated in its last roll of the jellyroll structure so as to expose the bare aluminum electrode and spot-welding, or crimping the last roll of positive electrode sheet 402 to case 304 of FIG. 3 which may be conductive, or by spot-welding or crimping positive conductor 412 to case 304 of FIG. 3, thereby forming an external connection from positive electrode sheet 402 through case 304 of FIG. 3.

Power is typically provided from a battery, such as battery 302 of FIG. 3 to a device, such as user equipment 100 of FIG. 1, via conducting pads, such as positive contact pad 306 and negative contact pad 312 of FIG. 3.

Figure 5:
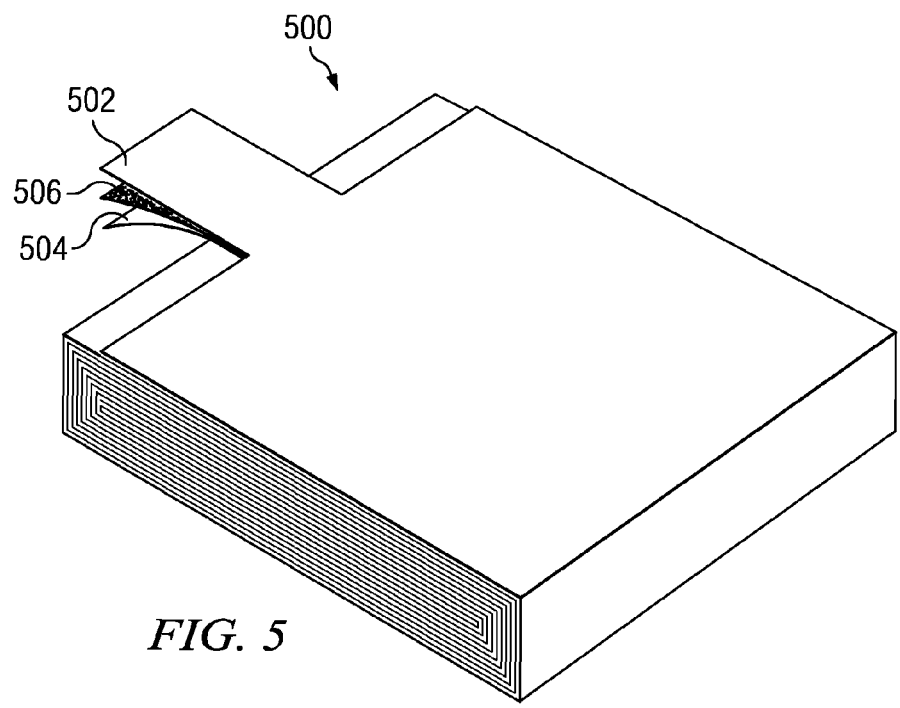
FIG. 5 is a schematic representation of the positive and negative electrodes with other layers of a battery in a rolled-up configuration in accordance with an illustrative embodiment.

Turning now to FIG. 5, a schematic representation of the positive and negative electrodes with other layers of a battery in a rolled-up configuration is depicted in accordance with an illustrative embodiment. Electrode assembly 500 may be one implementation of jellyroll configuration 262 of FIG. 2.

An illustrative embodiment of electrode assembly 500 may have positive tab 504 and negative tab 502 connected to positive and negative electrodes, respectively, at the same point of the electrode assembly 500 with an insulator 506 between the positive and negative electrodes. As a result, the currents in the electrodes can flow in opposite directions. Moreover, the magnitude of the current in each of the electrodes can be substantially the same. The electrodes are preferably very close to each other, typically separated by a distance of around 150 microns. The distance selected is one such that the magnetic fields generated by the opposing currents substantially cancel each other out.

In alternative embodiments, the positive and negative tabs may be connected to the respective positive and negative electrodes at any point along the jellyroll. As an example, the positive and negative tabs may be connected at midpoints of the respective positive and negative electrodes in the jellyroll. Further alternatives could have the positive and negative tabs at a point that is one-third the length of the jellyroll or any other fraction of the length of the jellyroll.

Positive tab 504 and negative tab 502 are symmetrical in that they protrude from the same side of the jellyroll, are at the same angle with respect to the jellyroll, and are both the same size.

The magnetic field resulting from the currents inside and outside the battery case may be reduced even further by closely routing the positive and negative conductors that carry the current from the jellyroll to the case or routing a conductor in opposite directions with the case as separation.

Figure 6:
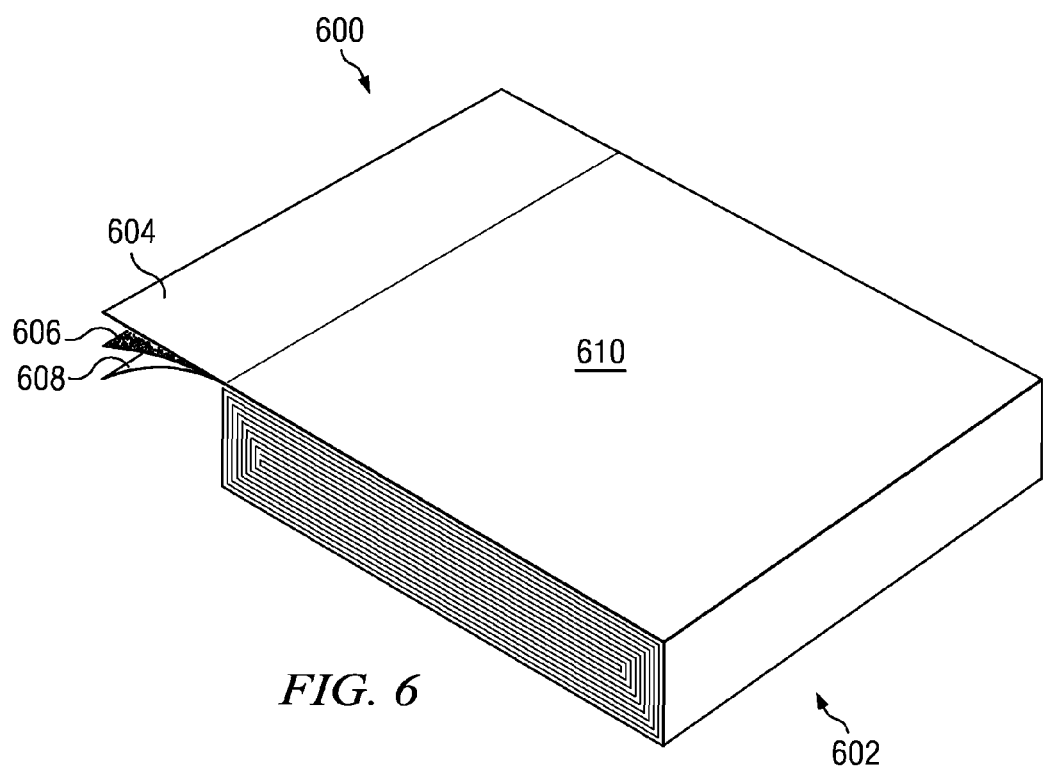
FIG. 6 is a schematic representation of the positive and negative electrodes with other layers of a battery in a rolled-up configuration in accordance with an illustrative embodiment.

Turning now to FIG. 6, a schematic representation of the positive and negative electrodes with other layers of a battery in a rolled-up configuration is depicted in accordance with an illustrative embodiment. Jellyroll 602 may be one implementation of jellyroll configuration 262 of FIG. 2. Also, jellyroll 602 may be an example of one implementation of one embodiment of electrode assembly 400 as shown in FIG. 4.

As depicted, jellyroll 602 comprises a positive electrode sheet, a negative electrode sheet, insulator 606, positive conductor 604, and negative conductor 608. Positive conductor 604 may be one implementation of first conductor 212 of FIG. 2. Negative conductor 608 may be one implementation of second conductor 216 of FIG. 2. Insulator 606 may be one implementation of separator 210 of FIG. 2.

Positive conductor 604 and negative conductor 608 are connected along the entire length of an end of the positive and negative electrodes, respectively. In other embodiments, positive conductor 604 and negative conductor 608 may be located in different areas of jellyroll 602, different sizes, not connected along the entire length of the positive and negative electrodes, or connected to a different end, such as an end that is perpendicular to the axis of jellyroll 602. As a result, the currents in electrodes 610 can flow in opposite directions. Moreover, the magnitude of the current in each of the electrodes may be substantially the same. In the final assembly, electrodes 610 are preferably close enough to each other such that the magnetic fields generated by the opposing currents cancel each other out. In these illustrative examples, the distance between electrodes 610 may be, for example, without limitation, around 150 microns.

Figure 7:
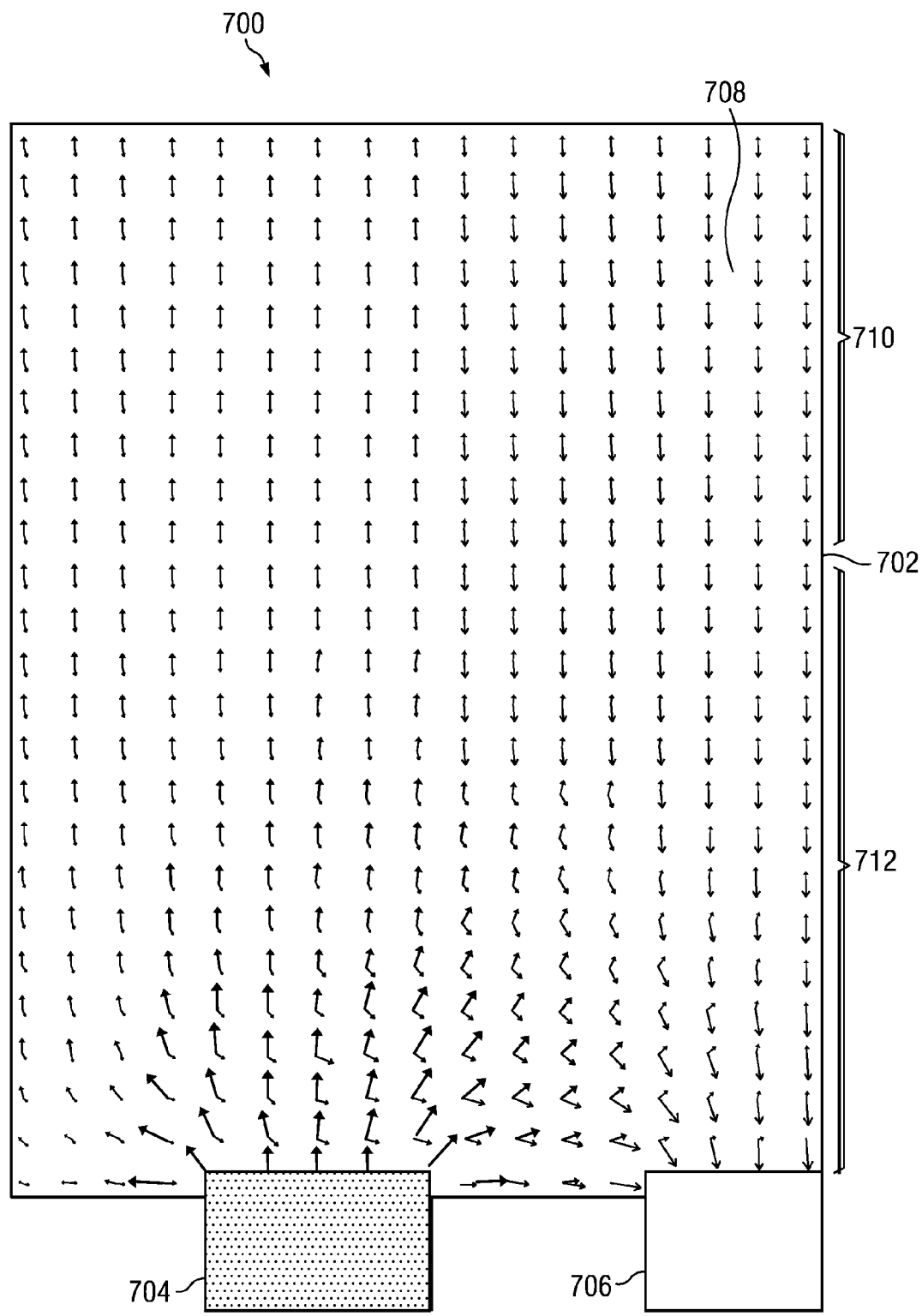
FIG. 7 is a schematic representation that depicts the final layer of a prior art battery with a positive tab and a negative tab to assist in explaining illustrative embodiments.

Turning now to FIG. 7, a schematic representation of the final layer of a currently known battery design with a positive tab and a negative tab is depicted to assist in explaining different illustrative embodiments. Layer 702 is an example of a layer that may be in battery 202 in FIG. 2.

In this illustrative example, layer 702 is the last layer of a jellyroll. Layer 702 comprises electric currents 708. While it appears in FIG. 7 that layer 702 is a single layer, it is recognized that layer 702 may be representative of a plurality of layers, such as plurality of layers 256 in battery 202 of FIG. 2. The plurality of layers may comprise a positive electrode, negative electrode, and a separator. Additionally, while it appears in FIG. 7 that negative tab 704 and positive tab 706 are both connected to a single layer, it is recognized that negative tab 704 and positive tab 706 are connected to different layers. For example, positive tab 706 may be connected to a positive electrode of layer 702.

Electric currents 708 comprise positive and negative electric currents. As shown in FIG. 7, the positive and negative electric currents of electric currents 708 are substantially uniform in direction and magnitude in the portion 710 of layer 702 furthest from negative tab 704 and positive tab 706. As electric currents 708 approach negative tab 704 in portion 712 of layer 702, the negative currents become stronger than the positive currents. Also, the direction of electric currents 708 becomes distorted to radiate outward from negative tab 704 in portion 712. Similarly, as electric currents 708 approach positive tab 706, in portion 712, the positive currents become stronger than the negative currents. Also, the direction of electric currents 708 becomes distorted to radiate inward to positive tab 706. Such magnitude changes, and distortion of the positive and negative electric currents, can result in magnetic fields in the vicinity of the battery.

Figure 8:
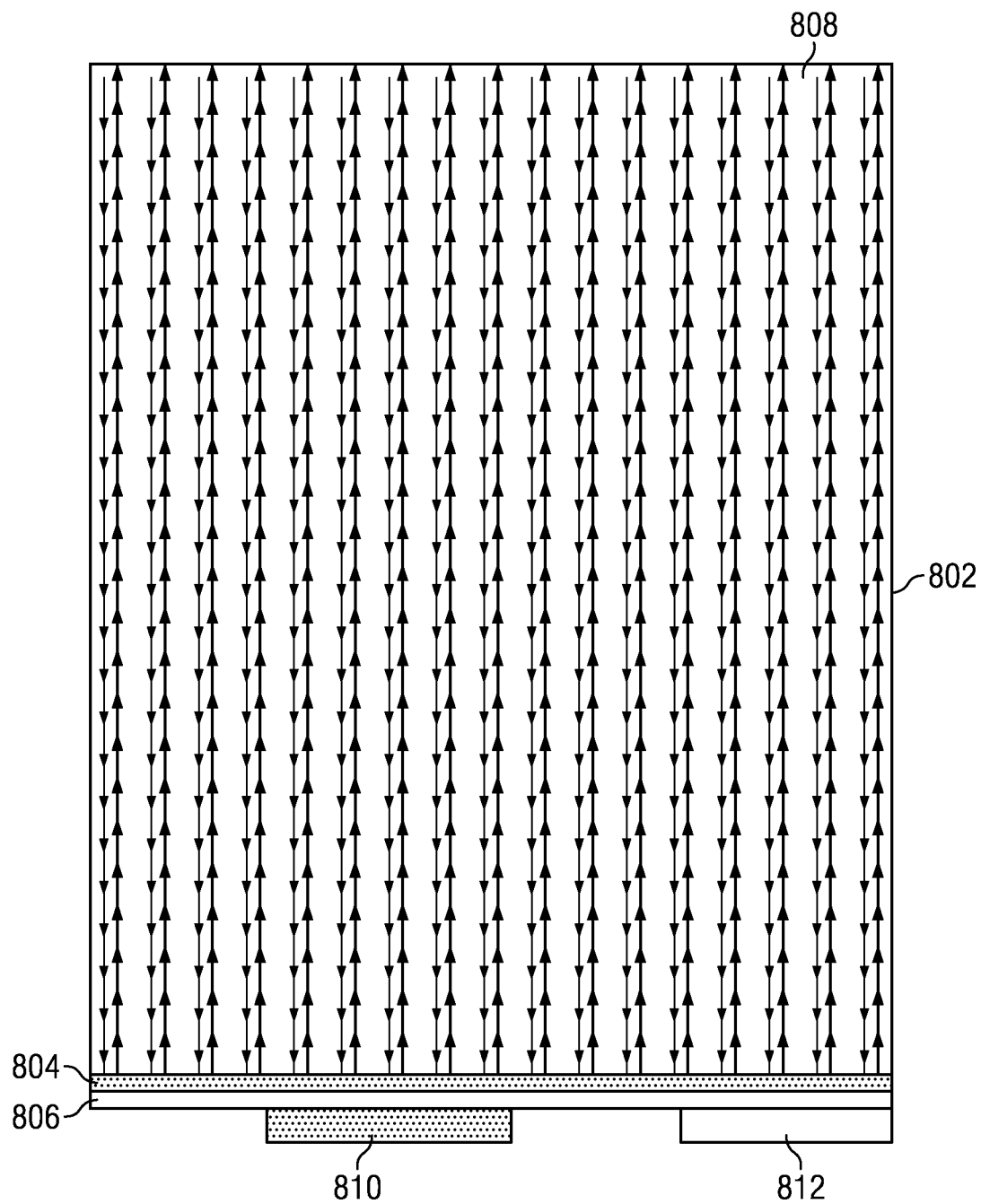
FIG. 8 is a schematic representation of the final layer of a battery jellyroll with a positive conductor and a negative conductor which allows the currents to flow with similar magnitude and opposite direction in the electrode in accordance with an illustrative embodiment.

Turning now to FIG. 8, a schematic representation of a final layer of a battery jellyroll with a positive conductor and a negative conductor is depicted which allows the currents to flow with similar magnitude and opposite direction in the electrode in accordance with an illustrative embodiment. Layer 802 is an example of a layer that may be in battery 202 in FIG. 2.

Layer 802 is the last layer of a jellyroll. Layer 802 comprises electric currents 808. While it appears in FIG. 8 that layer 802 is a single layer, it is recognized that layer 802 may be representative of a plurality of layers, such as plurality of layers 256 in battery 202 of FIG. 2. The plurality of layers may comprise a positive electrode, negative electrode, and a separator. Additionally, while it appears in FIG. 8 that negative conductor 804 and positive conductor 806 are both connected to a single layer, it is recognized that negative conductor 804 and positive conductor 806 are connected to different layers. For example, positive conductor 806 may be connected to a positive electrode of layer 802. Also, while it appears in FIG. 8 that negative conductor 804 and positive conductor 806 are side by side, it is recognized that negative conductor 804 and positive conductor 806 are overlapping and shown only in a manner in which they are shown for purposes of clarity.

In contrast with electric currents 708 of FIG. 7, the positive currents and negative currents of electric currents 808 are in substantially opposite direction and substantially equal in magnitude throughout layer 802, which may also be referred to as electric currents 808 "matching", "substantially matching", being "substantially matched", or being "matched". Matching may be defined as a current having an opposite current that is in substantially equal in magnitude and opposite in direction. Since the currents are matched having equal magnitude but opposite direction, the magnetic fields caused by these currents will substantially cancel each other out.

Electric currents 808 are matched because negative conductor 804 and positive conductor 806 are substantially symmetric and substantially proximate to each other. Negative conductor 804 is connected to the negative electrode of layer 802 and positive conductor 806 is connected to the positive electrode of layer 802. Since negative conductor 804 and positive conductor 806 are extended across the entire length of the edge of layer 802, and have a higher conductivity than the electrodes, the positive electric currents of electric currents 808 are pulled equally across layer 802. In contrast, in layer 702 of FIG. 7, the positive currents of electric currents 708 are pulled towards the portion of layer 702 with positive tab 706 and the negative currents are pulled towards the portion of layer 702 with negative tab 704.

While electric currents 808 are matched, the currents in negative conductor 804 and positive conductor 806 are not matched. The negative currents will be pulled towards tab 810 of negative conductor 804 and the positive currents will be pulled towards tab 812 of positive conductor 806.

Figure 9:
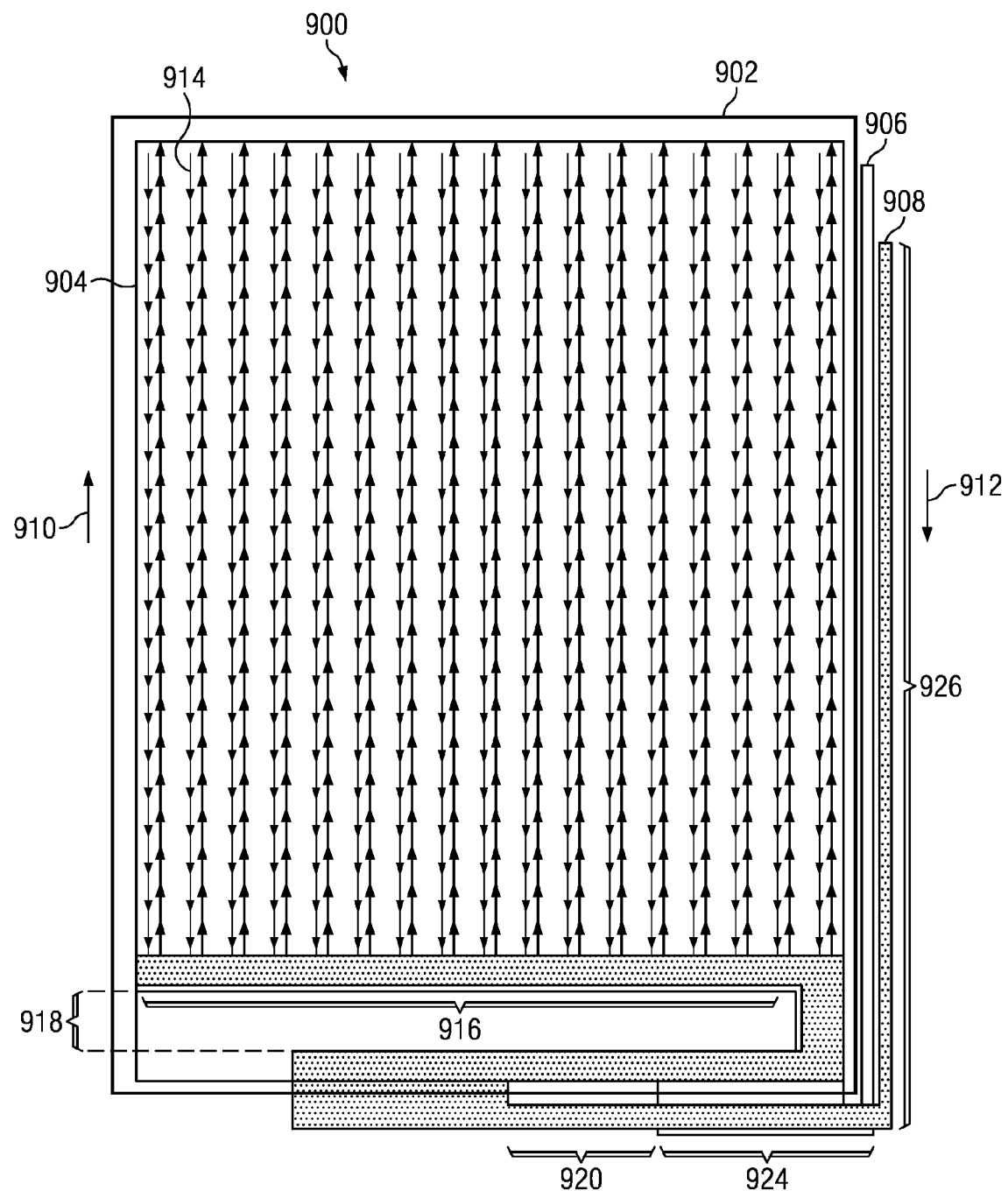
FIG. 9 is a schematic representation of a final layer of a battery jellyroll with a positive conductor and a negative conductor routed to contact pads of the battery in accordance with an illustrative embodiment.

Turning now to FIG. 9, a schematic representation of a final layer of a battery jellyroll with a positive conductor and a negative conductor routed to contact pads is depicted in accordance with an illustrative embodiment. Battery 900 is an example of one implementation of battery 202 in FIG. 2.

In this illustrative example, battery 900 comprises case 902, a jellyroll, layer 904, positive conductor 906, and negative conductor 908. Case 902 comprises a jellyroll with layer 904. Layer 904 is the last layer of a jellyroll. While it appears in FIG. 9 that layer 904 is a single layer, it is recognized that layer 904 may be representative of a plurality of layers, such as plurality of layers 256 of FIG. 2. The plurality of layers may comprise a positive electrode, negative electrode, and a separator. Additionally, while it appears in FIG. 9 that negative conductor 908 and positive conductor 906 are both connected to a single layer, it is recognized that negative conductor 908 and positive conductor 906 are connected to different layers. For example, positive conductor 906 may be connected to a positive electrode of layer 904.

Also, while it appears in FIG. 9 that negative conductor 908 and positive conductor 906 are side by side, it is recognized that negative conductor 908 and positive conductor 906 are overlapping. This presentation is shown for purposes of clarity in describing an illustrative embodiment. Also, while layer 904 appears to be a single rectangle, it is recognized that the portion furthest from first section 916 and at the top of the figure would wrap around underneath to form the rest of the jellyroll and the portion closest to first section 916 and at the bottom of the figure stops and is the last part of the jellyroll. Here, the jellyroll would have a horizontal axis.

Layer 904 comprises electric currents 914. The positive currents of electric currents 914 may flow in the direction indicated by arrow 912 and the negative currents of electric currents 914 may flow in the direction indicated by arrow 910. Electric currents 914 are just one illustration of the flow of currents. Electric currents 914 may flow in other directions; for example, the positive and negative currents may flow in opposite directions. Layer 904 also comprises a plurality of layers. The plurality of layers may include, but are not limited to, a positive electrode, a separator, and a negative electrode. The positive currents and negative currents of electric currents 914 are in substantially opposite directions and substantially equal in magnitude throughout layer 904, which may also be referred to as electric currents 914 "matching", "substantially matching", being "substantially matched", or being "matched". Alternatively, positive or negative currents may be matched by themselves in an opposite direction. For example, a portion of a conductor with a negative current may be matched by a portion of the conductor in the opposite direction with the same negative current.

In these depicted examples, electric currents 914 are matched because negative conductor 908 and positive conductor 906 are symmetric across the negative and positive electrodes as negative conductor 908 and positive conductor 906 pull current from the positive and negative electrodes, unlike the currents near the conductors 704 and 706 of FIG. 7. The term "symmetric" is defined as being proximate to one another and similar in shape. When negative conductor 908 and positive conductor 906 are symmetric across the negative and positive electrodes, electric currents 914 in the electrodes are pulled evenly to the negative conductor 908 and positive conductor 906 to keep the positive and negative currents matching. In different embodiments, negative conductor 908 and positive conductor 906 may be extended across the entire length of an end of layer 904, extended across a different end, and/or only a portion of an end of layer 904. Negative conductor 908 is connected to the negative electrode of layer 904 and positive conductor 906 is connected to the positive electrode of layer 904. Since negative conductor 908 and positive conductor 906 are extended across the entire length of the end of layer 904, the positive and electric currents of electric currents 914 are pulled evenly vertical across layer 904.

The positive currents in positive conductor 906 and negative currents in negative conductor 908 are all substantially matched. In first section 916, negative conductor 908 overlaps and is symmetric to positive conductor 906. Alternatively, positive conductor 906 may overlap negative conductor 908. Also, in second section 918 and fifth section 926, negative conductor 908 overlaps positive conductor 906. In first section 916, second section 918, and fifth section 926, the positive currents in positive conductor 906 and negative currents in negative conductor 908 are in substantially opposite directions and substantially equal in magnitude and therefore matched. Second section 918 receives the current from first section 916 and transmits the current to the rest of positive conductor 906 and negative conductor 908. In third section 920, there are only negative currents in negative conductor 908 without any positive currents for the negative currents to match. Third section 920 is along the separation distance between the positive feed-through and negative feed-through. The separation distance may be any distance. Additionally, the two portions of negative conductor 908 in third section 920 may be separated by around 1 mm or less, with case 902 between the two portions. However, the negative currents match themselves since the current flowing through negative conductor 908 inside the case flowing in one direction and then proximately in the opposite direction through negative conductor 908 outside the case. Additionally, fourth section 924 operates similarly to third section 920. Positive currents inside of case 902 match themselves with positive currents outside of case 902. Additionally, first section 916, second section 918, the portion inside the case of third section 920, and the portion inside the case of fourth section 924 are all located on the end of layer 904. Since first section 916 extends across the entire length of an end of layer 904, electric currents 914 from the positive and negative electrodes are not able to flow to third section 920 and fourth section 924. The different illustrative embodiments recognize that when currents are matched or substantially matched, electromagnetic fields surrounding the conductors and electrodes are reduced. When currents are matched as shown in here, the electromagnetic field surrounding battery 900 may be reduced by about 20-30 dB.

Figure 10:
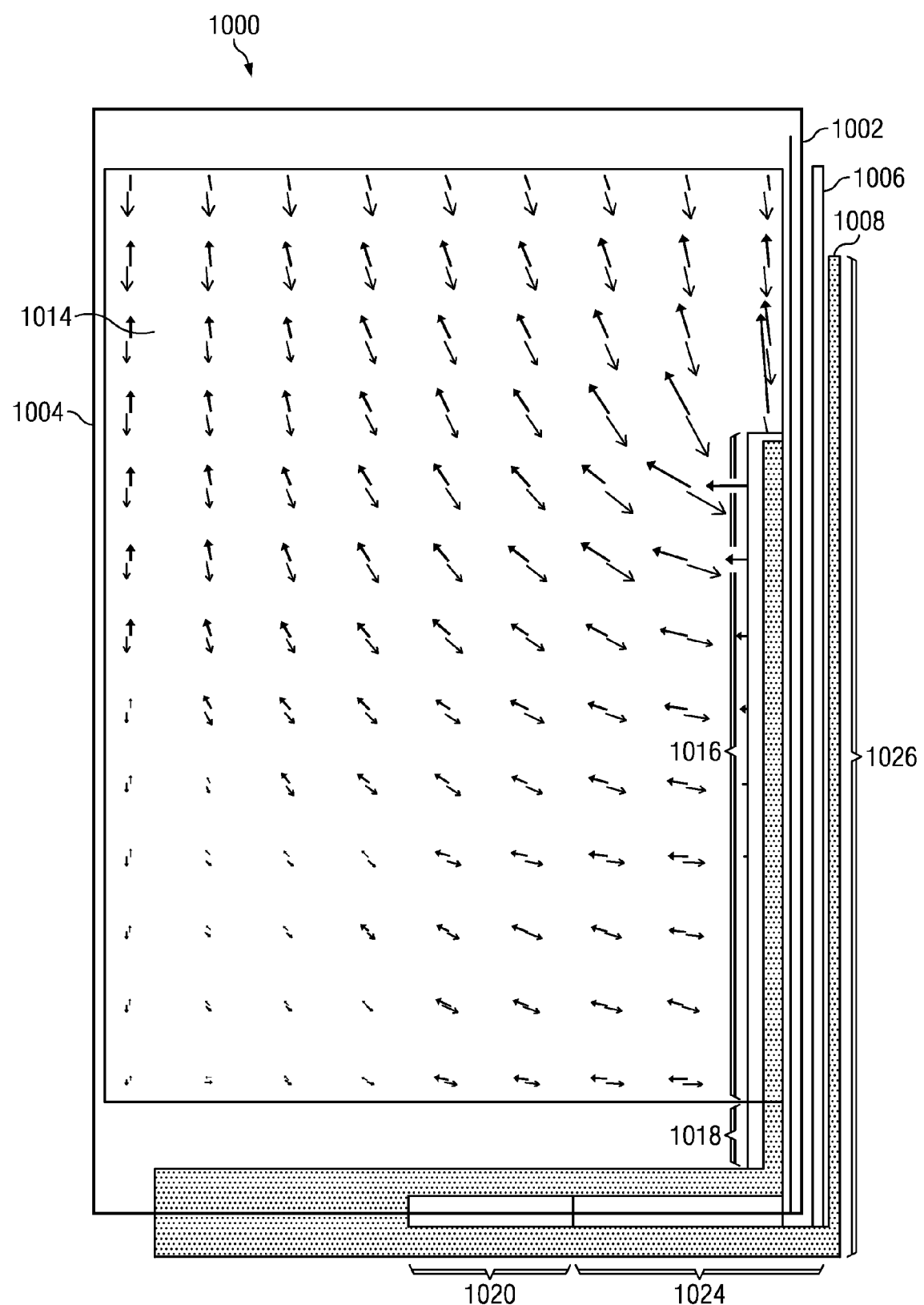
FIG. 10 is a schematic representation of a final layer of a battery jellyroll with a positive conductor and a negative conductor routed to contact pads of the battery in accordance with an illustrative embodiment.

Turning now to FIG. 10, a schematic representation of a final layer of a battery jellyroll with a positive conductor and a negative conductor routed to contact pads is depicted in accordance with an illustrative embodiment. Battery 1000 is an example of one implementation of battery 202 in FIG. 2. Battery 1000 may also be one implementation of battery 900 of FIG. 9 except negative conductor 1008 and positive conductor 1006 are extended across a different end and only a portion of an end of the last layer of a jellyroll.

In this illustrative example, battery 1000 comprises case 1002, a jellyroll, layer 1004, positive conductor 1006, and negative conductor 1008. Case 1002 comprises a jellyroll with layer 1004. Layer 1004 is the last layer of a jellyroll. While it appears in FIG. 10 that layer 1004 is a single layer, it is recognized that layer 1004 may be representative of a plurality of layers, such as plurality of layers 256 of FIG. 2. The plurality of layers may comprise a positive electrode, negative electrode, and a separator. Additionally, while it appears in FIG. 10 that negative conductor 1008 and positive conductor 1006 are both connected to a single layer, it is recognized that negative conductor 1008 and positive conductor 1006 are connected to different layers. For example, positive conductor 1006 may be connected to a positive electrode of layer 1004.

Also, while it appears in FIG. 10 that negative conductor 1008 and positive conductor 1006 are side by side, it is recognized that negative conductor 1008 and positive conductor 1006 are overlapping. This presentation is shown for purposes of clarity in describing an illustrative embodiment. Also, while layer 1004 appears to be a single rectangle, it is recognized that the portion furthest from third section 1020 and at the top of the figure would wrap around underneath to form the rest of the jellyroll and the portion closest to third section 1020 and at the bottom of the figure stops and is the last part of the jellyroll. Here, the jellyroll would have a horizontal axis.

Layer 1004 comprises electric currents 1014. Layer 1004 also comprises a plurality of layers. The plurality of layers may include, but is not limited to, a positive electrode, a separator, and a negative electrode. The positive currents and negative currents of electric currents 1014 are in substantially opposite directions and substantially equal in magnitude throughout layer 1004 even though electric currents 1014 are not fully horizontal or vertical across layer 1004 as are the electric currents 914 in FIG. 9.

In FIG. 10, negative conductor 1008 and positive conductor 1006 are located on a different end than negative conductor 908 and positive conductor 906 of FIG. 9. Also, in FIG. 10, negative conductor 1008 and positive conductor 1006 extend across a portion of the end of layer 1004 which is not the entire length. In different embodiments, negative conductor 1008 and positive conductor 1006 may extend across the entire length of the end of layer 1004. Positive and negative electric currents in negative conductor 1008 and positive conductor 1006 are matched, similar to FIG. 9. In different illustrative embodiments, negative conductor 1008 and positive conductor 1006 may be located in a different section of layer 1004, extend to areas other than an end of layer 1004, or may extend to different layers of the jellyroll.

In these depicted examples, electric currents 1014 are matched because negative conductor 1008 and positive conductor 1006 are symmetric across the negative and positive electrodes as negative conductor 1008 and positive conductor 1006 pull current from the positive and negative electrodes, unlike the currents near the conductors 704 and 706 of FIG. 7. When negative conductor 1008 and positive conductor 1006 are symmetric across the negative and positive electrodes, electric currents 1014 in the electrodes are pulled evenly to the negative conductor 1008 and positive conductor 1006 to keep the positive and negative currents matching. In different embodiments, negative conductor 1008 and positive conductor 1006 may be extended across the entire length of an end of layer 1004, extended across a different end, and/or only a portion of an end of layer 1004. Negative conductor 1008 is connected to the negative electrode of layer 1004 and positive conductor 1006 is connected to the positive electrode of layer 1004. Since negative conductor 1008 and positive conductor 1006 are not extended across the entire length of the end of layer 1004, the positive and negative currents of electric currents 1014 are not pulled evenly vertical or horizontal across layer 1004, but still remain matched.

The positive currents in positive conductor 1006 and negative currents in negative conductor 1008 are all substantially matched. In first section 1016, negative conductor 1008 overlaps and is symmetric to positive conductor 1006. Alternatively, positive conductor 1006 may overlap negative conductor 1008. Also, in second section 1018 and fifth section 1026, negative conductor 1008 overlaps positive conductor 1006. In first section 1016, second section 1018, and fifth section 1026, the positive currents in positive conductor 1006 and negative currents in negative conductor 1008 are in substantially opposite directions and substantially equal in magnitude and therefore matched. Second section 1018 receives the current from first section 1016 and transmits the current to the rest of positive conductor 1006 and negative conductor 1008. In third section 1020, there are only negative currents in negative conductor 1008 without any positive currents for the negative currents to match. Third section 1020 is along the separation distance between the positive feed-through and negative feed-through. The separation distance may be any distance. Additionally, the two portions of negative conductor 1008 in third section 1020 may be separated by around 1 mm or less, with case 1002 between the two portions. However, the negative currents match themselves since the current flowing through negative conductor 1008 inside the case flowing in one direction and then proximately in the opposite direction through negative conductor 1008 outside the case. Additionally, fourth section 1024 operates similarly to third section 1020. Positive currents inside of case 1002 match themselves with positive currents outside of case 1002. Additionally, in contrast to the sections of FIG. 9, only first section 1016 is located on the end of layer 1004. The different illustrative embodiments recognize that when currents are matched or substantially matched, electromagnetic fields surrounding the conductors and electrodes are reduced.

Figure 11:
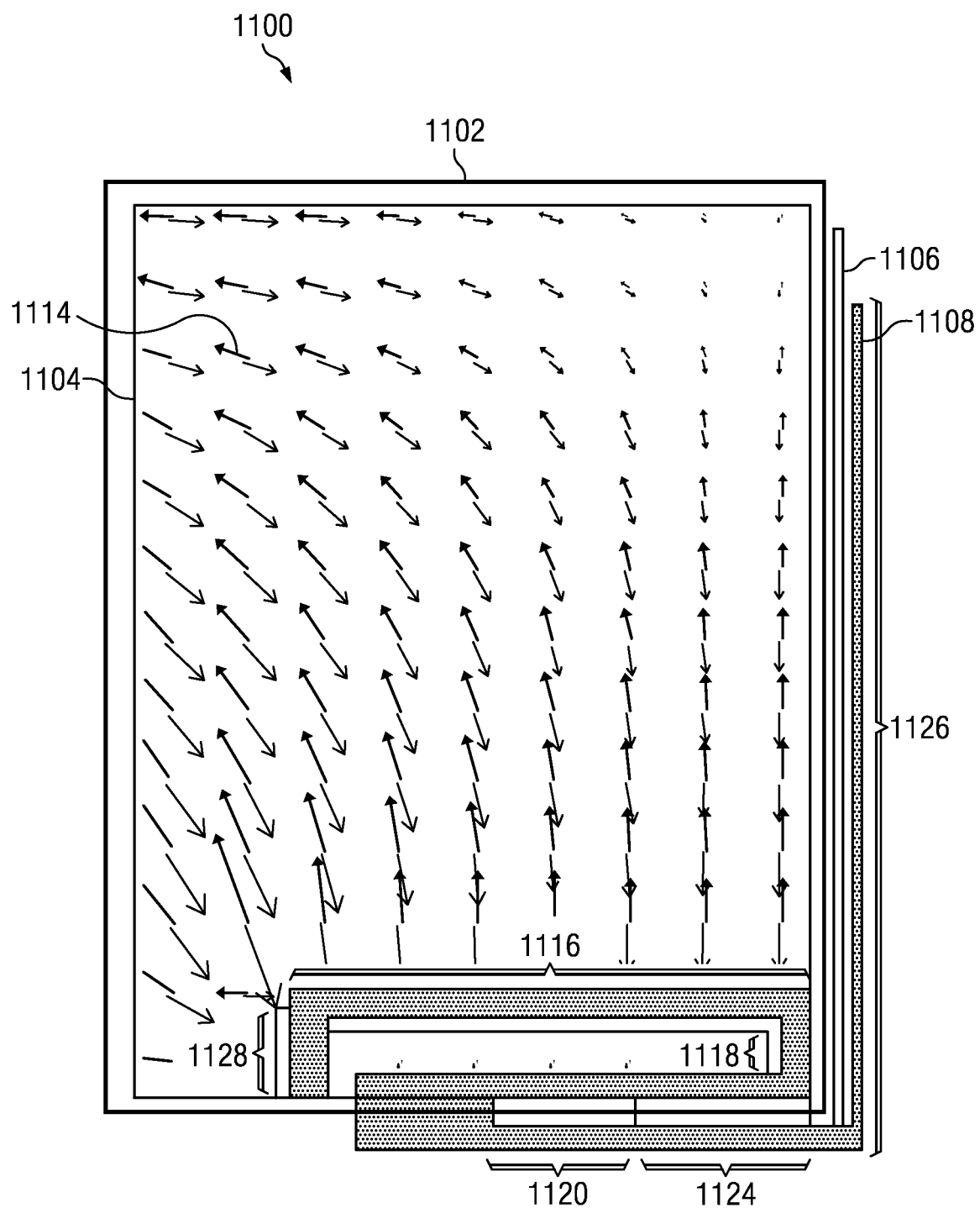
FIG. 11 is a schematic representation of a final layer of a battery jellyroll with a positive conductor and a negative conductor routed to contact pads of the battery in accordance with an illustrative embodiment.

In contrast to FIG. 9 and FIG. 11, first section 1016 does not prevent electric currents 1014 from directly reaching the rest of the sections of FIG. 10 without going through first section 1016. However, the rest of the sections of FIG. 10 remain unconnected to layer 1004; therefore, electric currents 1014 are unable to reach the rest of the sections.

Turning now to FIG. 11, a schematic representation of a final layer of a battery jellyroll with a positive conductor and a negative conductor routed to contact pads is depicted in accordance with an illustrative embodiment. Battery 1100 is an example of one implementation of battery 202 in FIG. 2.

In this illustrative example, battery 1100 comprises case 1102, a jellyroll, layer 1104, positive conductor 1106, and negative conductor 1108. Case 1102 comprises a jellyroll with layer 1104. Layer 1104 is the last layer of a jellyroll. While it appears in FIG. 11 that layer 1104 is a single layer, it is recognized that layer 1104 may be representative of a plurality of layers, such as plurality of layers 256 of FIG. 2. The plurality of layers may comprise a positive electrode, negative electrode, and a separator. Additionally, while it appears in FIG. 11 that negative conductor 1108 and positive conductor 1106 are both connected to a single layer, it is recognized that negative conductor 1108 and positive conductor 1106 are connected to different layers. For example, positive conductor 1106 may be connected to a positive electrode of layer 1104.

Also, while it appears in FIG. 11 that negative conductor 1108 and positive conductor 1106 are side by side, it is recognized that negative conductor 1108 and positive conductor 1106 are overlapping. This presentation is shown for purposes of clarity in describing an illustrative embodiment. Also, while layer 1104 appears to be a single rectangle, it is recognized that the portion furthest from fifth section 1126, and at the left of the figure, would wrap around underneath to form the rest of the jellyroll and the portion closest to fifth section 1126 and at the right of the figure stops, and is the last part of the jellyroll. Here, the jellyroll would have a vertical axis.

Layer 1104 comprises electric currents 1114. Layer 1104 also comprises a plurality of layers. The plurality of layers may include, but is not limited to, a positive electrode, a separator, and a negative electrode. The positive currents and negative currents of electric currents 1114 are in substantially opposite directions and substantially equal in magnitude throughout layer 1104. Electric currents 1114 are different from electric currents 914 in FIG. 9 in that electric currents 1114 are not fully horizontal or vertical across layer 1104.

In FIG. 11, negative conductor 1108 and positive conductor 1106 are located on a different end than negative conductor 908 and positive conductor 906 of FIG. 9. Also, in FIG. 11, negative conductor 1108 and positive conductor 1106 extend across a portion of the end of layer 1104 which is not the entire length. In different embodiments, negative conductor 1108 and positive conductor 1106 may extend across the entire length of the end of layer 1104. Positive and negative electric currents in negative conductor 1108 and positive conductor 1106 are matched, similar to FIG. 9. In different illustrative embodiments, negative conductor 1108 and positive conductor 1106 may be located in a different section of layer 1104, extend to areas other than an end of layer 1004, or may extend to different layers of the jellyroll.

In these depicted examples, electric currents 1114 are matched because negative conductor 1108 and positive conductor 1106 are symmetric across the negative and positive electrodes as negative conductor 1108 and positive conductor 1106 pull current from the positive and negative electrodes, unlike the currents near the conductors 704 and 706 of FIG. 7. When negative conductor 1108 and positive conductor 1106 are symmetric across the negative and positive electrodes, electric currents 1114 in the electrodes are pulled evenly to the negative conductor 1108 and positive conductor 1106 to keep the positive and negative currents matching. In different embodiments, negative conductor 1108 and positive conductor 1106 may be extended across the entire length of an end of layer 1104, extended across a different end, and/or only a portion of an end of layer 1104. Negative conductor 1108 is connected to the negative electrode of layer 1104 and positive conductor 1106 is connected to the positive electrode of layer 1104. Since negative conductor 1108 and positive conductor 1106 are not extended across the entire length of the end of layer 1004, the positive and electric currents of electric currents 1114 are not pulled evenly vertical or horizontal across layer 1004, but still remain matched.

The positive currents in positive conductor 1106 and negative currents in negative conductor 1108 are all substantially matched. In first section 1116, negative conductor 1108 overlaps and is symmetric to positive conductor 1106. Alternatively, positive conductor 1106 may overlap negative conductor 1108. Also, in second section 1118, fifth section 1126, and sixth section 1128, negative conductor 1108 overlaps positive conductor 1106. In first section 1116, second section 1118, fifth section 1126, and sixth section 1128, the positive currents in positive conductor 1106 and negative currents in negative conductor 1108 are in substantially opposite directions and substantially equal in magnitude and therefore matched. Second section 1118 receives the current from first section 1116 and sixth section 1128 and transmits the current to the rest of positive conductor 1106 and negative conductor 1108. In third section 1120, there are only negative currents in negative conductor 1108 without any positive currents for the negative currents to match. Third section 1120 is along the separation distance between the positive feed-through and negative feed-through. The separation distance may be any distance. Additionally, the two portions of negative conductor 1108 in third section 1120 may be separated by around 1 mm or less, with case 1102 between the two portions. However, the negative currents match themselves since the current flowing through negative conductor 1108 inside the case flowing in one direction and then proximately in the opposite direction through negative conductor 1108 outside the case. Additionally, fourth section 1124 operates similarly to third section 1120. Positive currents inside of case 1102 match themselves with positive currents outside of case 1102. Additionally, first section 1116, second section 1118, the portion inside the case of third section 1120, the portion inside the case of fourth section 1124, and sixth section 1128 are all located on the end of layer 1104. Since first section 1116 extends from the point where the jellyroll stops to sixth section 1128 and sixth section 1128 extends down to an edge of layer 1104, electric currents 1114 from the positive and negative electrodes are not able to flow to third section 1120 and fourth section 1124, distorting the matching of electric currents 1114 and the currents in third section 1120 and fourth section 1124. The different illustrative embodiments recognize that when currents are matched or substantially matched, electromagnetic fields surrounding the conductors and electrodes are reduced.

It is recognized that the illustrative embodiments in FIGS. 9-11 are only a few of the possible embodiments. It is recognized that first section 916 of the positive and negative conductors in FIG. 9 prevent most of the current in the electrodes from reaching the rest of the sections which are located on the electrodes. It is recognized that since only first section 1016 in FIG. 10 is located on the electrodes, there is no need to prevent the current of the electrodes from reaching to the other sections of the positive and negative conductors in FIG. 10. It is recognized that a combination of first section 1116 and sixth section 1128 in FIG. 11 prevent most of the current in the electrodes from reaching the rest of the sections which are located on the electrodes. Different embodiments may have different structures. In FIGS. 9-11, the inside portion of the negative conductor which is not matched by the positive conductor, but by the outside portion of the negative conductor, does not receive current from the negative electrode whether the inside portion of the negative conductor is on the negative electrode or not. It is also recognized that while it is stated herein that the electric current is prevented from reaching, or that the inside portion of the negative conductor does not receive, electric current from the electrodes, there may be a nominal amount of electric current that reaches the inside portion of the negative conductor. In different embodiments, the structure of the negative conductor may be replaced with the positive conductor and vice versa.

Figure 12:
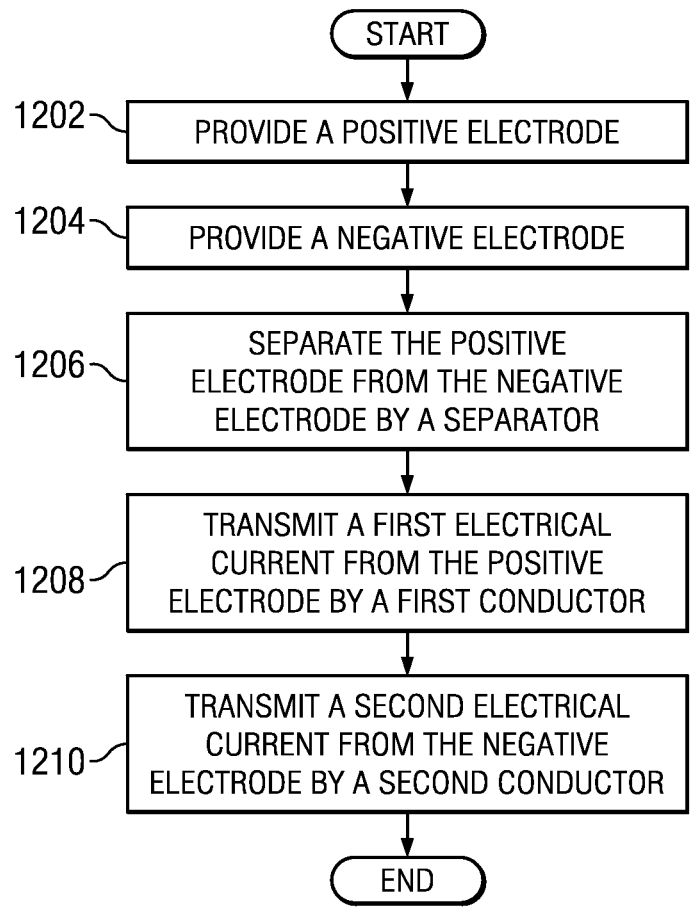
FIG. 12 is a flowchart of a process for transmitting electricity in accordance with an illustrative embodiment.

In reference to FIG. 12, a flowchart of a process for transmitting electricity is depicted in accordance with an illustrative embodiment. The process illustrated in FIG. 12 may be implemented in a device, such as user equipment 100 in FIG. 1 in which a battery, such as battery 202 in FIG. 2 is used.

The process begins by providing a positive electrode (step 1202). The process also provides a negative electrode (step 1204). The process separates the positive electrode from the negative electrode by a separator (step 1206). The process also transmits a first electrical current from the positive electrode by a first conductor (step 1208). Additionally, the process transmits a second electrical current from the negative electrode, by a second conductor (step 1210). A direction of the first electrical current transmitted through the first conductor is substantially opposite to a direction of the second electrical current transmitted through the second conductor. A magnitude of the first electrical current is substantially equal to a magnitude of the second electrical current. Also, the first and second conductors are proximate to one another.

FIGS. 13-18 are schematic representations of a final layer of a battery jellyroll with a positive conductor and a negative conductor in accordance with illustrative embodiments.

Figure 13:
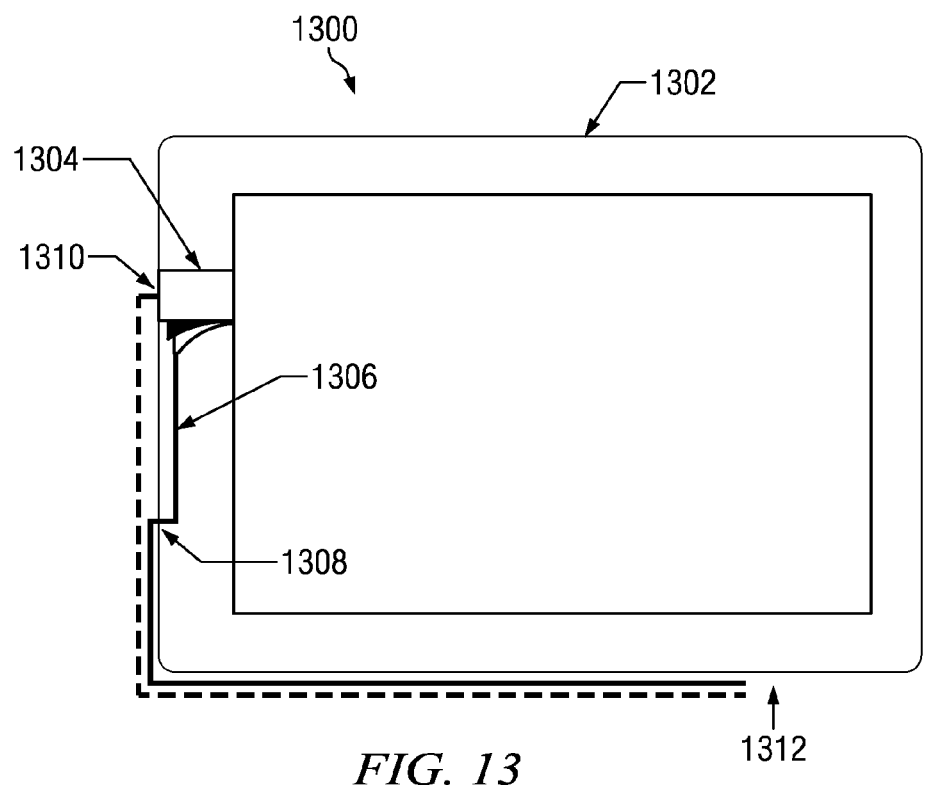
FIG. 13 is a schematic representation of a final layer of a battery jellyroll with a positive conductor and a negative conductor routed to contact pads of the battery in accordance with an illustrative embodiment.

Turning to FIG. 13, a schematic representation of a final layer of a battery jellyroll with a positive conductor and a negative conductor routed to contact pads of the battery is depicted in accordance with an illustrative embodiment. Battery 1300 is an example of one implementation of battery 202 in FIG. 2. Battery 1300 comprises case 1302. Section 1304 may be overlapping positive and negative tabs with an insulator between the positive and negative tabs. Wire 1306 is disposed from a positive electrode through the case at positive feed-through 1308. Positive feed-through 1308 may be the case. Battery 1300 comprises negative feed-through 1310. Battery 1300 also comprises battery pads 1312.

Figure 14:
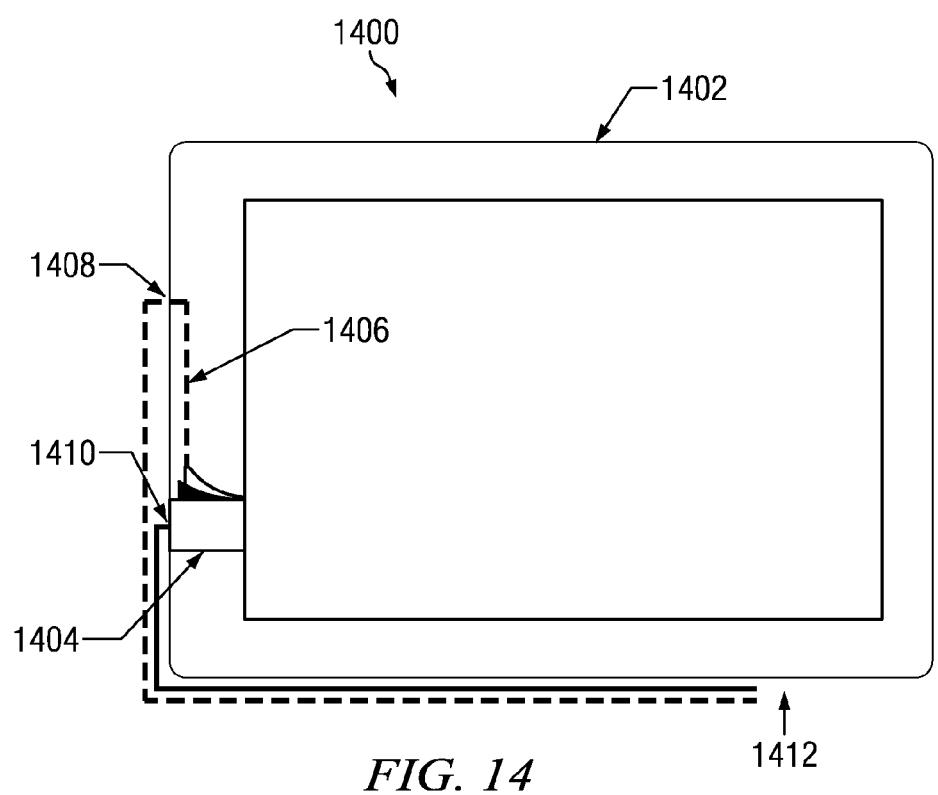
FIG. 14 is a schematic representation of a final layer of a battery jellyroll with a positive conductor and a negative conductor routed to contact pads of the battery in accordance with an illustrative embodiment.

Turning to FIG. 14, a schematic representation of a final layer of a battery jellyroll with a positive conductor and a negative conductor routed to contact pads of the battery is depicted in accordance with an illustrative embodiment. Battery 1400 is an example of one implementation of battery 202 in FIG. 2. Battery 1400 comprises case 1402. Section 1404 may be overlapping positive and negative tabs with an insulator between the positive and negative tabs. Wire 1406 is disposed from a negative electrode through the case at negative feed-through 1408. Battery 1400 comprises positive feed-through 1410. Positive feed-through 1410 may be the case. Battery 1400 also comprises battery pads 1412.

Figure 15:
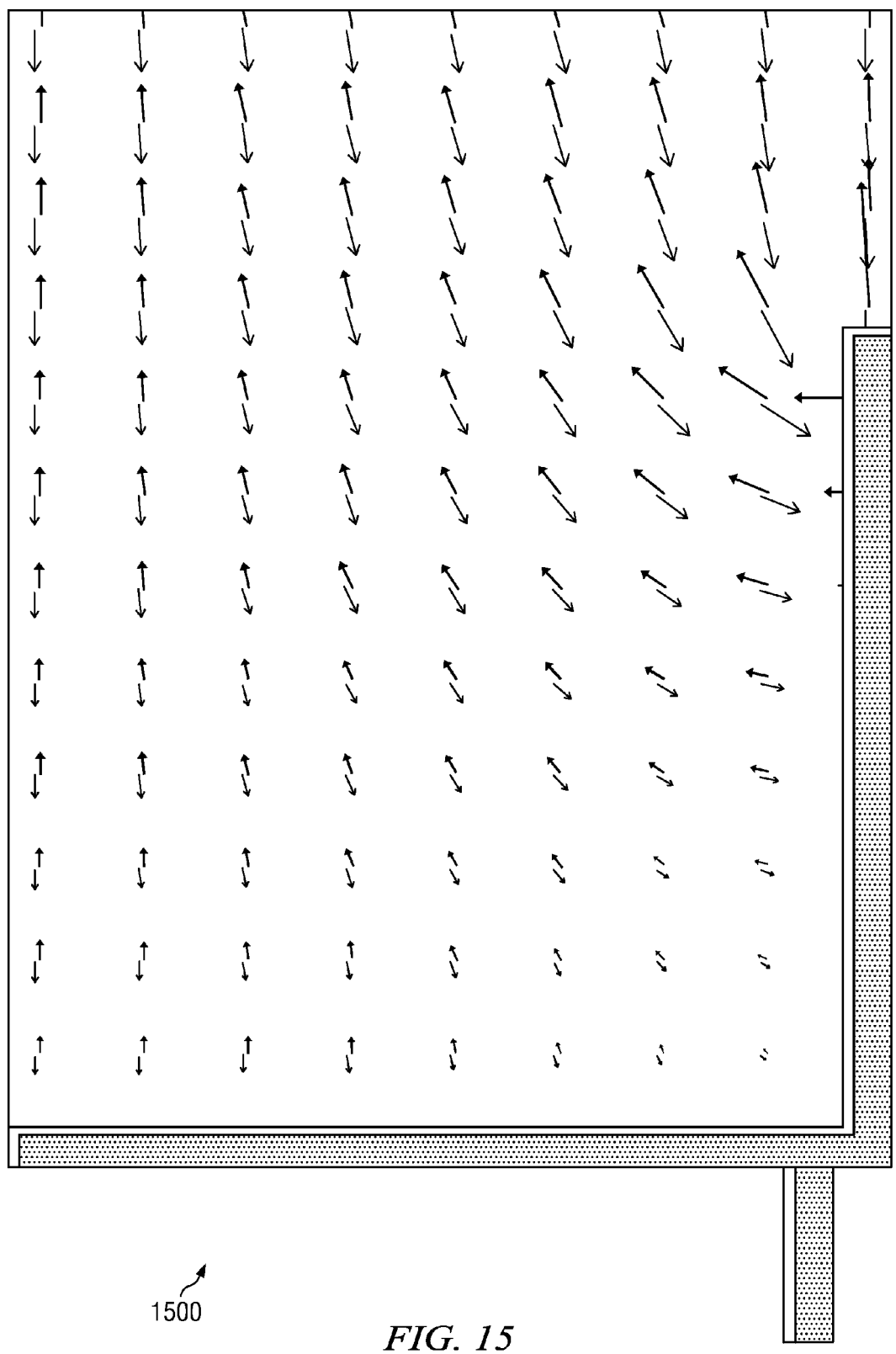
FIG. 15 is a schematic representation of a final layer of a battery jellyroll with a positive conductor and a negative conductor in accordance with an illustrative embodiment.

Turning to FIG. 15, a schematic representation of a final layer of a battery jellyroll with a positive conductor and a negative conductor is depicted in accordance with an illustrative embodiment. Battery 1500 is an example of one implementation of battery 202 in FIG. 2.

Figure 16:
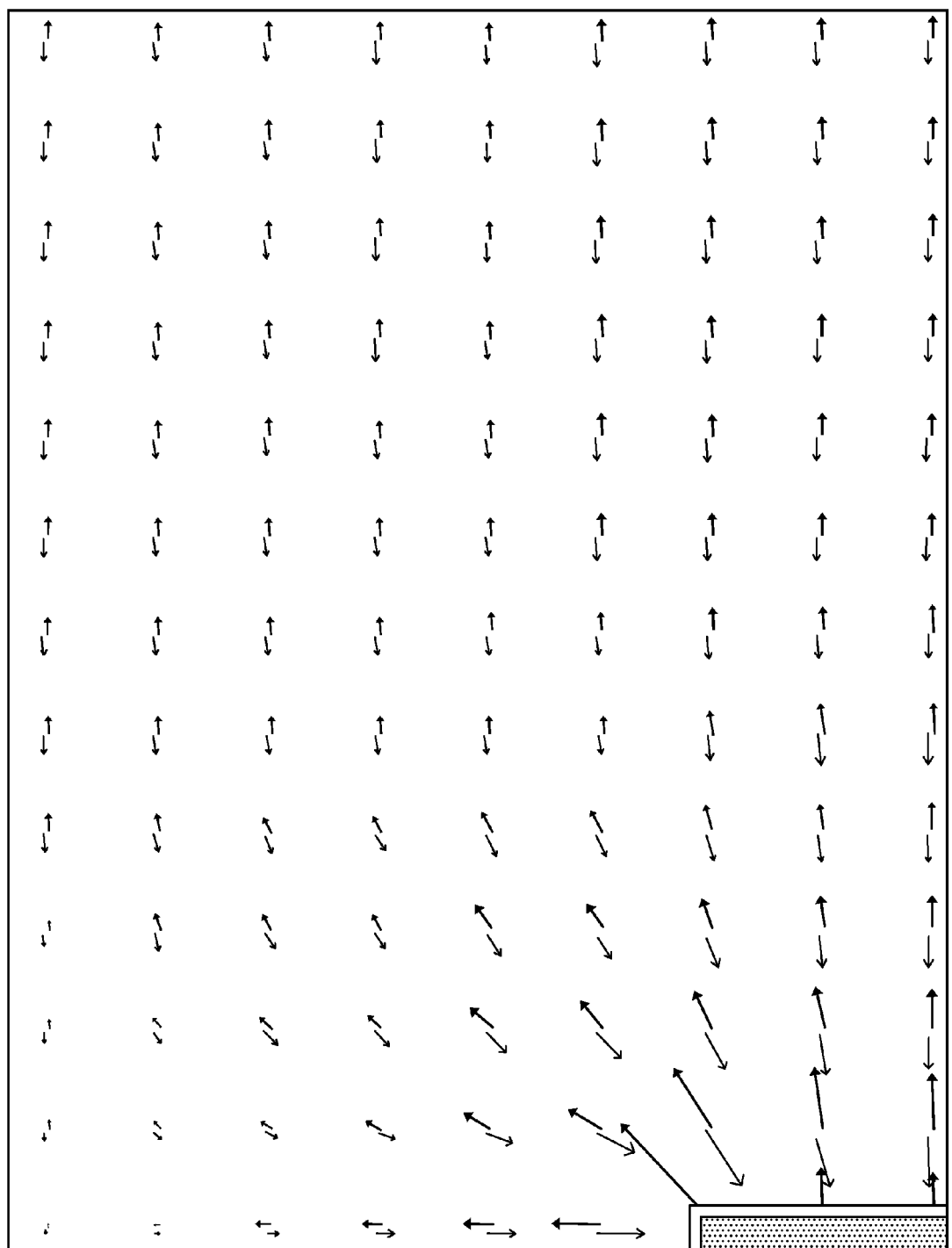
FIG. 16 is a schematic representation of a final layer of a battery jellyroll with a positive conductor and a negative conductor in accordance with an illustrative embodiment.

Turning to FIG. 16, a schematic representation of a final layer of a battery jellyroll with a positive conductor and a negative conductor is depicted in accordance with an illustrative embodiment. Battery 1600 is an example of one implementation of battery 202 in FIG. 2.

Figure 17:
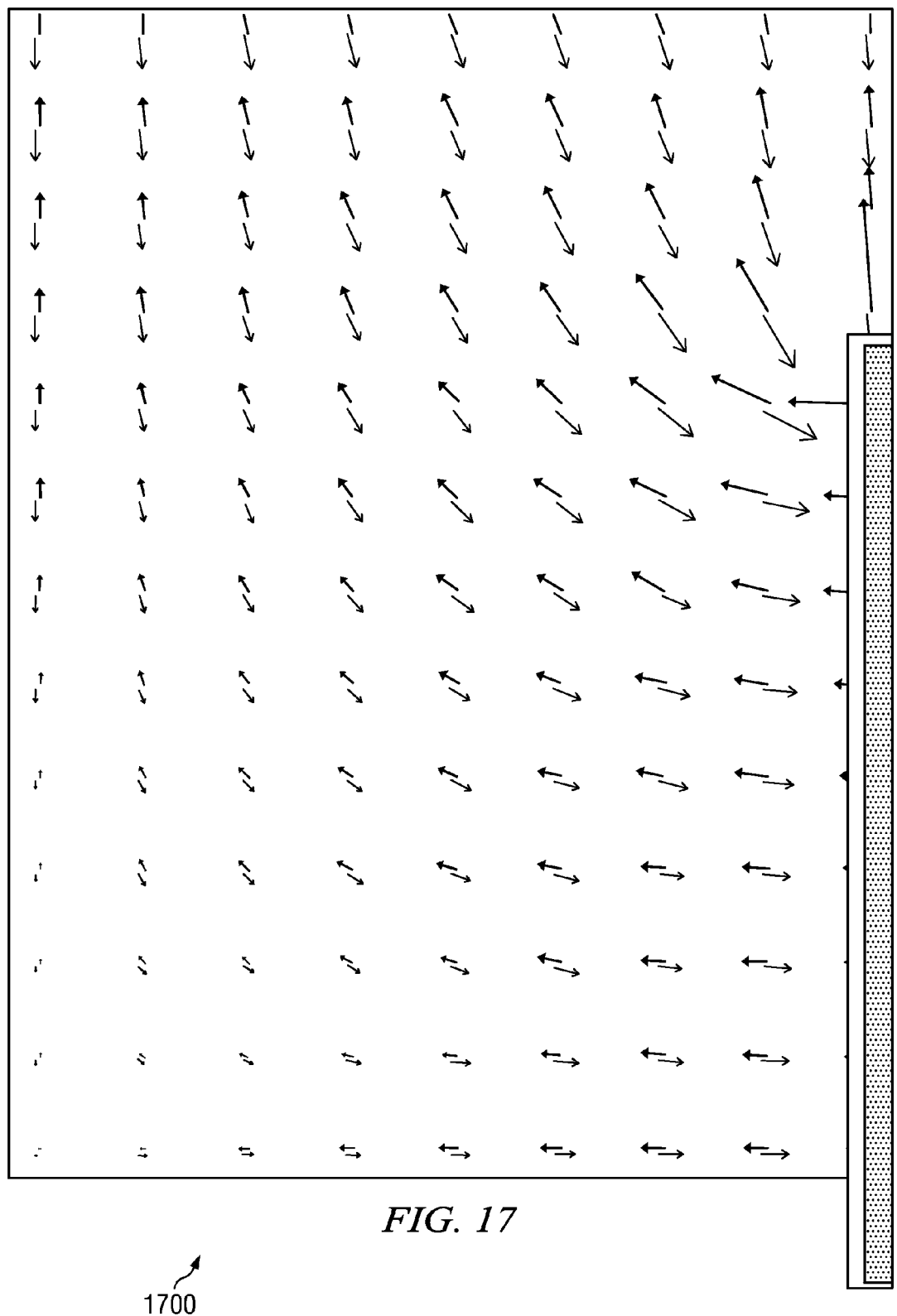
FIG. 17 is a schematic representation of a final layer of a battery jellyroll with a positive conductor and a negative conductor in accordance with an illustrative embodiment.

Turning to FIG. 17, a schematic representation of a final layer of a battery jellyroll with a positive conductor and a negative conductor is depicted in accordance with an illustrative embodiment. Battery 1700 is an example of one implementation of battery 202 in FIG. 2.

Figure 18:
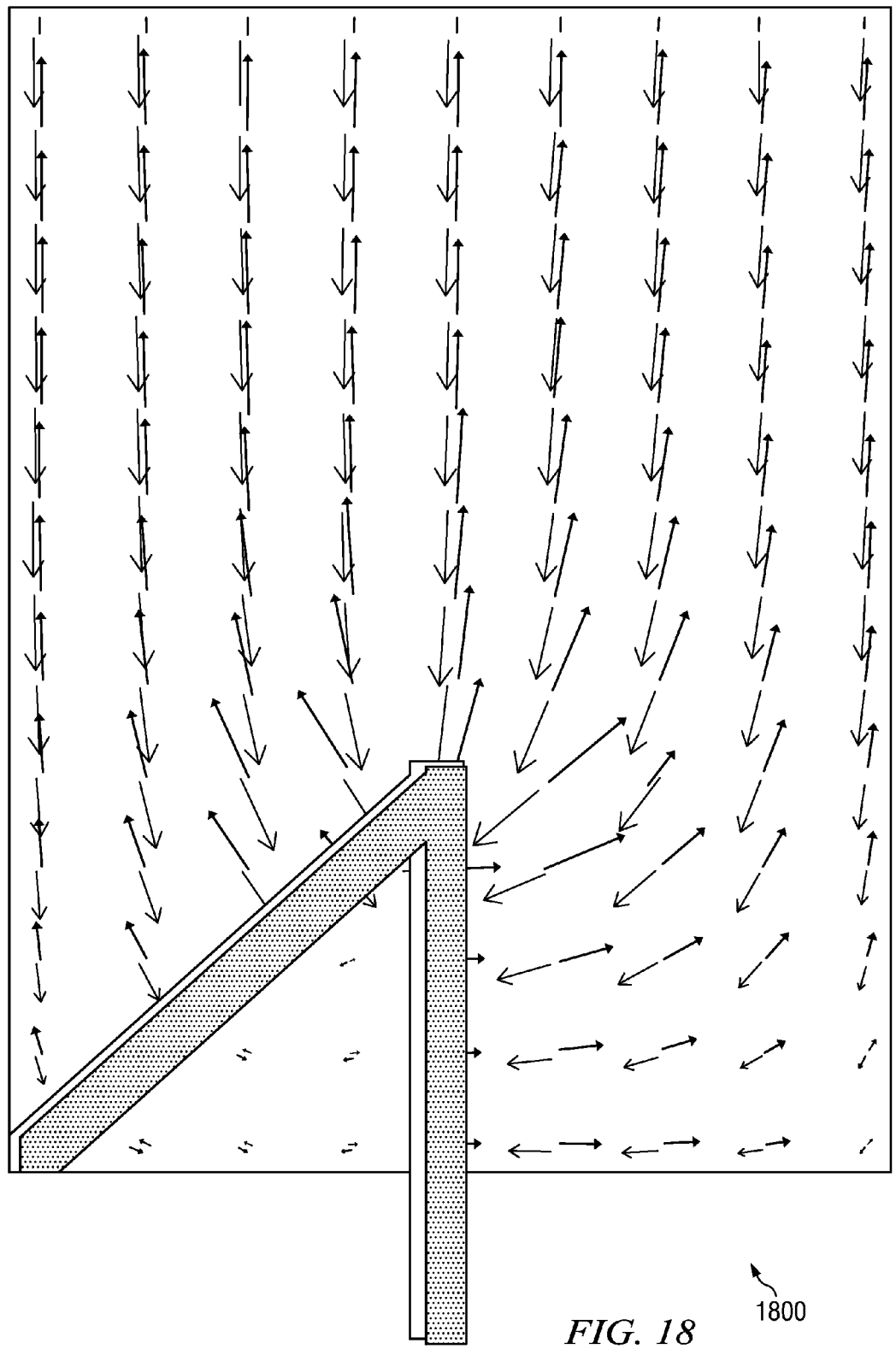
FIG. 18 is a schematic representation of a final layer of a battery jellyroll with a positive conductor and a negative conductor in accordance with an illustrative embodiment.

Turning to FIG. 18, a schematic representation of a final layer of a battery jellyroll with a positive conductor and a negative conductor is depicted in accordance with an illustrative embodiment. Battery 1800 is an example of one implementation of battery 202 in FIG. 2.

The flowcharts and block diagrams in the different depicted embodiments illustrate the architecture, functionality, and operation of some possible implementations of apparatus and methods in different illustrative embodiments. In this regard, each block in the flowchart or block diagrams may represent a module, segment, function, and/or a portion of an operation or step. In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved.

Additionally, whereas the above mentioned battery design rules are discussed in connection with battery conductors that carry high currents, a person of skill in the art will understand that other battery conductors and terminals that do not draw any significant current do not need to adhere to the above-mentioned design rules. For example, if the current is a small fraction (e.g. one-thirtieth to one-fortieth of the current of the high-current carrying conductors and terminals) it is not necessary to apply the foregoing design rules to such battery conductors and terminals. Also, whereas an exemplary embodiment of a lithium battery has been discussed above, the principles set forth herein apply to other batteries such as lithium ion polymer batteries, lithium ion prismatic batteries, lead acid batteries, nickel metal-hydride batteries, nickel cadmium batteries, alkaline batteries, or batteries yet to be designed.

All such embodiments and applications are believed to be within the scope of this disclosure in its broadest aspects and as set forth in the following claims.

What is claimed is:

1. An apparatus, comprising:
   a positive electrode;
   a negative electrode;
   a separator, the positive electrode and the negative electrode being separated by the separator;
   a first conductor configured to transmit a first electrical current from the positive electrode;
   a second conductor configured to transmit a second electrical current from the negative electrode, a direction of the first electrical current transmitted through the first conductor being substantially opposite to a direction of the second electrical current transmitted through the second conductor, a magnitude of the first electrical current being substantially equal to a magnitude of the second electrical current, and the first and second conductors being proximate to one another;
   a case, wherein the positive and negative electrodes are located inside the case, and wherein at least a portion of the first and second conductors are located outside the case;
   a positive feedthrough and a negative feedthrough, the positive feedthrough and the negative feedthrough being spaced apart from one another by a separation distance, wherein a first portion of one of the first and second conductors is located inside the case along the separation distance, and a second portion of the one of the first and second conductors is located outside the case along the separation distance, wherein the first portion is parallel to the second portion and the first or second electrical current transmitted through the first portion is transmitted in an opposite direction to the first or second current transmitted through the second portion.

2. The apparatus of claim 1, wherein the first and second portions of the one of the first and second conductors are spaced from one another by a distance of about one mm or less along the separation distance.

3. The apparatus of claim 1, wherein the magnitude of the first electrical current differs from the magnitude of the second electrical current by no more than about ten percent.

4. The apparatus of claim 1, wherein the positive electrode and the negative electrode each comprises a plurality of layers, and wherein the first conductor extends across a portion of the end of a last layer of the positive electrode, and the second conductor extends across a portion of the end of a last layer of the negative electrode.

5. The apparatus of claim 4, wherein the positive electrode and the negative electrode are configured to form a jellyroll configuration.

6. The apparatus of claim 1, further comprising:
a positive contact pad located outside the case; and
a negative contact pad located outside the case, wherein the first conductor is connected to the positive contact pad and the second conductor is connected to the negative contact pad.

7. The apparatus of claim 1, wherein each of the first and second electrical conductors comprises an electrical conductivity that is higher than an electrical conductivity of the positive and negative electrodes.

8. The apparatus of claim 7, wherein the electrical conductivity of the first and second conductors is at least about 10 times higher than the electrical conductivity of the positive and negative electrodes.

9. The apparatus of claim 1, wherein the first conductor is attached to the positive electrode and extends across a portion of an end of the positive electrode, and the second conductor is attached to the negative electrode and extends across a portion of an end of the negative electrode.

10. The apparatus of claim 9, wherein the portion of an end of the positive electrode comprises substantially an entire length of the end of the positive electrode, and wherein the portion of an end of the negative electrode comprises substantially an entire length of the end of the negative electrode.

11. The apparatus of claim 1, wherein the positive electrode, the negative electrode, the separator, the first conductor, the second conductor, and the case form a rechargeable battery, the apparatus further comprising:
a wireless mobile communications device having a battery interface, wherein the battery is configured to connect to the rechargeable battery interface and provide power to the wireless mobile communications device.

* * * * *